(12) United States Patent
Kayanaka et al.

(10) Patent No.: US 10,723,136 B2
(45) Date of Patent: Jul. 28, 2020

(54) IMAGE FORMATION DEVICE

(71) Applicant: BROTHER KOGYO KABUSHIKI KAISHA, Nagoya-shi, Aichi-ken (JP)

(72) Inventors: Yoshihisa Kayanaka, Kuwana (JP); Naoki Mizuno, Takahama (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/716,808

(22) Filed: Sep. 27, 2017

(65) Prior Publication Data
US 2018/0281446 A1 Oct. 4, 2018

(30) Foreign Application Priority Data

Mar. 31, 2017 (JP) .................................. 2017-073265

(51) Int. Cl.
*B41J 2/21* (2006.01)
*B41J 3/54* (2006.01)
(Continued)

(52) U.S. Cl.
CPC ........... *B41J 2/2117* (2013.01); *B41J 2/2132* (2013.01); *B41J 2/2135* (2013.01); *B41J 3/543* (2013.01); *B41J 19/147* (2013.01); *G06K 15/105* (2013.01); *G06K 15/107* (2013.01); *B41J 2/04541* (2013.01); *B41J 2/04566* (2013.01);
(Continued)

(58) Field of Classification Search
CPC ............................ B41J 2/2117; G06K 15/107
See application file for complete search history.

(56) References Cited

U.S. PATENT DOCUMENTS

| 7,699,425 | B2 | 4/2010 | Tanaka et al. |
| 7,794,077 | B2 | 9/2010 | Falser et al. |
| 9,211,699 | B2 | 12/2015 | Rossell et al. |
| 2001/0006392 | A1 | 7/2001 | Otsuki |

(Continued)

FOREIGN PATENT DOCUMENTS

| JP | 2001-162841 A | 6/2001 |
| JP | 2005-319663 A | 11/2005 |

(Continued)

OTHER PUBLICATIONS

U.S. Appl. No. 15/717,256, filed Sep. 27, 2017 titled "Image Formation Device".

(Continued)

*Primary Examiner* — Julian D Huffman
(74) *Attorney, Agent, or Firm* — K&L Gates LLP

(57) ABSTRACT

An image formation device includes a plurality of nozzles, a processor which forms an image on the basis of print data, and a memory which stores computer-readable instructions that, when executed by the processor, perform processes including, performing first ejection control which ejects a first amount of the ink at a timing of one of a forward path and a return path in the main scan direction, when printing is performed by a multi-pass method in which each of pixel arrays is printed by a plurality of main scans and, in each of the plurality of main scans, the ink is ejected onto the same pixel array from the respectively different nozzles, and performing second ejection control configured to eject a second amount of the ink at a timing different from the previous timing of the ejection of the ink, the second amount being smaller than the first amount.

9 Claims, 17 Drawing Sheets

(51) Int. Cl.
   *G06K 15/10*      (2006.01)
   *B41J 19/14*      (2006.01)
   *B41J 2/045*      (2006.01)

(52) U.S. Cl.
   CPC ........ *B41J 2/04573* (2013.01); *B41J 2/04581* (2013.01); *B41J 2/21* (2013.01)

(56) References Cited

U.S. PATENT DOCUMENTS

| | | |
|---|---|---|
| 2003/0112284 A1 | 6/2003 | Otsuki |
| 2012/0268752 A1* | 10/2012 | Komamiya .......... G06K 15/107 358/1.2 |
| 2013/0194334 A1 | 8/2013 | Watanabe |

FOREIGN PATENT DOCUMENTS

| | | |
|---|---|---|
| JP | 2006-326939 A | 12/2006 |
| JP | 2013-121664 A | 6/2013 |
| JP | 2013-154513 A | 8/2013 |
| JP | 2013-154517 A | 8/2013 |
| JP | 2013156772 A | 8/2013 |
| JP | 2013-224018 A | 10/2013 |
| JP | 2015-007175 A | 1/2015 |
| JP | 2017-222159 A | 12/2017 |

OTHER PUBLICATIONS

Japanese Office Action dated Mar. 5, 2019 in connection with Japanese Application No. 2017-073263.
Japanese Office Action dated Mar. 19, 2019 in connection with Japanese Application No. 2017-073265.
Decision on Rejection dated May 28, 2019 in connection with Japanese Patent Application No. 2017-073265. (6 pages).
Non-Final Office Action dated May 2, 2019 in connection with U.S. Appl. No. 15/717,256. (7 pages).

* cited by examiner

FIG. 5

| | | 421 | | | |
|---|---|---|---|---|---|
| HEADER INFORMATION | | RESOLUTION | | | |
| | | DENSITY INFORMATION | | | |
| | | PLATEN INFORMATION | | | |
| | | PRINT METHOD SPECIFICATION INFORMATION | | | |
| RASTER INFORMATION | PIXEL ARRAY NUMBER | COLOR INFORMATION | LEFT MARGIN | RIGHT MARGIN | RASTER DATA |
| | 1 | WHITE 1 | ... | ... | 1 1 1 1 1 1 1 1 1 ... 1 |
| | | WHITE 2 | ... | ... | 1 1 1 1 1 1 1 1 1 ... 1 |
| | | WHITE 3 | ... | ... | 1 1 1 1 1 1 1 1 1 ... 1 |
| | | WHITE 4 | ... | ... | 1 1 1 1 1 1 1 1 1 ... 1 |
| | | CYAN | ... | ... | 1 1 1 1 1 1 1 1 1 ... 1 |
| | | MAGENTA | ... | ... | 1 1 1 1 1 1 1 1 1 ... 1 |
| | | YELLOW | ... | ... | 1 1 1 1 1 1 1 1 1 ... 1 |
| | | BLACK | ... | ... | 1 1 1 1 1 1 1 1 1 ... 1 |
| | 2 | WHITE 1 | ... | ... | 1 1 1 1 1 1 1 1 1 ... 1 |
| | | WHITE 2 | ... | ... | 1 1 1 1 1 1 1 1 1 ... 1 |
| | | WHITE 3 | ... | ... | 1 1 1 1 1 1 1 1 1 ... 1 |
| | | WHITE 4 | ... | ... | 1 1 1 1 1 1 1 1 1 ... 1 |
| | | CYAN | ... | ... | 1 1 1 1 1 1 1 1 1 ... 1 |
| | | MAGENTA | ... | ... | 1 1 1 1 1 1 1 1 1 ... 1 |
| | | YELLOW | ... | ... | 1 1 1 1 1 1 1 1 1 ... 1 |
| | | BLACK | ... | ... | 1 1 1 1 1 1 1 1 1 ... 1 |
| | ... | ... | ... | ... | ... |
| FOOTER INFORMATION | | | | | |

FIG. 9

| HEAD TYPE | NOZZLE | POINTER |
|---|---|---|
| WHITE 1 | NOZZLE[1] | 1 |
| | NOZZLE[2] | 5 |
| | ⋮ | ⋮ |
| | NOZZLE[420] | 1677 |
| WHITE 2 | NOZZLE[1] | 1 |
| | NOZZLE[2] | 5 |
| | ⋮ | ⋮ |
| | NOZZLE[420] | 1677 |
| WHITE 3 | NOZZLE[1] | 1 |
| | NOZZLE[2] | 5 |
| | ⋮ | ⋮ |
| | NOZZLE[420] | 1677 |
| WHITE 4 | NOZZLE[1] | 1 |
| | NOZZLE[2] | 5 |
| | ⋮ | ⋮ |
| | NOZZLE[420] | 1677 |
| CYAN | NOZZLE[1] | 8766 |
| | NOZZLE[2] | 8770 |
| | ⋮ | ⋮ |
| | NOZZLE[420] | 10442 |
| MAGENTA | NOZZLE[1] | 8766 |
| | NOZZLE[2] | 8770 |
| | ⋮ | ⋮ |
| | NOZZLE[420] | 10442 |
| YELLOW | NOZZLE[1] | 8766 |
| | NOZZLE[2] | 8770 |
| | ⋮ | ⋮ |
| | NOZZLE[420] | 10442 |
| BLACK | NOZZLE[1] | 8766 |
| | NOZZLE[2] | 8770 |
| | ⋮ | ⋮ |
| | NOZZLE[420] | 10442 |

| TYPE | LF VALUE | | | | | | | | 411 |
|---|---|---|---|---|---|---|---|---|---|
| | REMAINDER AFTER DIVIDING (LFn - 1) BY 8 | | | | | | | | |
| | 1 | 2 | 3 | 4 | 5 | 6 | 7 | 0 | |
| WHITE | 209 | 209 | 209 | 213 | 209 | 209 | 209 | 213 | |
| WHITE + COLOR | 207 | 212 | 209 | 210 | 212 | 207 | 212 | 211 | |
| NORMAL | 419 | 419 | 419 | 423 | 419 | 419 | 419 | 423 | |

FIG. 14

| RESOLUTION | PRINTING METHOD OF WHITE INK | COLOR MASK VALUE | | | | | | | |
|---|---|---|---|---|---|---|---|---|---|
| | | REMAINDER AFTER DIVIDING LFn BY 8 | | | | | | | |
| | | 1 | 2 | 3 | 4 | 5 | 6 | 7 | 0 |
| 1200 | NORMAL PRINTING | 0xffff | 0xffff | 0xffff | 0xffff | 0xffff | 0xffff | 0xffff | 0 |
| 1200 | MULTI-PASS METHOD | 0xffff | 0 | 0xffff | 0 | 0xffff | 0 | 0xffff | 0 |

| ROW | PRINTING ORDER | PRINTING DIRECTION | PRINTING ORDER | PRINTING DIRECTION |
|---|---|---|---|---|
| 4N-3 | 2 | RETURN PATH (PAUSE) | 5 | FORWARD PATH |
| 4N-2 | 3 | FORWARD PATH | 8 | RETURN PATH (PAUSE) |
| 4N-1 | 4 | RETURN PATH (PAUSE) | 7 | FORWARD PATH |
| 4N | 1 | FORWARD PATH | 6 | RETURN PATH (PAUSE) |

FIG. 16

| ROW | PRINTING ORDER | PRINTING DIRECTION | PRINTING ORDER | PRINTING DIRECTION |
|---|---|---|---|---|
| 4N-3 | 4 | RETURN PATH | 8 | RETURN PATH (PAUSE) |
| 4N-2 | 3 | FORWARD PATH | 7 | FORWARD PATH (PAUSE) |
| 4N-1 | 2 | RETURN PATH | 6 | RETURN PATH (PAUSE) |
| 4N | 1 | FORWARD PATH | 5 | FORWARD PATH (PAUSE) |

IMAGE FORMATION DEVICE

CROSS-REFERENCE TO RELATED APPLICATION

This application claims priority to Japanese Patent Application No. 2017-073265 filed on Mar. 31, 2017, the disclosure of which is herein incorporated by reference in its entirety.

BACKGROUND

The present disclosure relates to an image formation device.

An image formation device forms a pixel array configured by a plurality of ink dots aligned in a main scan direction, by ejecting ink from nozzles when a head provided with the nozzles is caused to move relative to a print medium in the main scan direction. The image formation device forms an image on the print medium by causing the head to move relative to the print medium in a sub scan direction, and forming a plurality of the pixel arrays in the sub scan direction. Further, a multi-pass method is known that forms a single pixel array by a plurality of main scans. For example, there is a multi-pass method that completes printing of each of the pixel arrays by causing different nozzles, among a plurality of nozzles provided in an ink head, to perform scanning of the same pixel array.

SUMMARY

In a known image formation device, when a head for white ink and a head for color ink are mounted on the same carriage, when the white ink is printed by a multi-pass method, the color ink can also be printed by the multi-pass method. However, when the printing is performed by the multi-pass method, in comparison to when the printing is performed by a single-pass method in which a single pixel array is formed by one main scan, a problem arises that a droplet amount of the ejected color ink varies and the hue of the printing changes. This is because, for example, in the printing of the multi-pass method, the frequency of a driving waveform for driving nozzles that eject the color ink decreases, and a droplet amount per droplet of the color ink ejected from the nozzles decreases. For example, in a case of a pale color, the color ink has a characteristic in that, when the frequency of the driving waveform for driving the nozzles decreases and the droplet amount per droplet of the color ink ejected from the nozzles decreases, its hue changes.

Embodiments of the broad principles derived herein provide an image formation device that decreases the possibility of a change in the hue of the printed pixels.

The embodiments herein provide an image formation device includes: a plurality of nozzles arranged in a sub scan direction and capable of ejecting ink; and a control portion. When printing is performed by a multi-pass method in which each of pixel arrays is printed by a plurality of main scans and, in each of the plurality of main scans, the ink is ejected onto the same pixel array from the respectively different nozzles, the control portion performs first ejection control which ejects a first amount of the ink at a timing of one of a forward path and a return path in the main scan direction, and second ejection control which ejects a second amount of the ink at a timing different from the previous timing of the ejection of the ink. The second amount is smaller than the first amount.

BRIEF DESCRIPTION OF THE DRAWINGS

Embodiments will be described below in detail with reference to the accompanying drawings in which:

FIG. 5 is a diagram showing print data;

FIG. 9 is a diagram showing a master pointer table;

FIG. 13 is a diagram showing an LF value table;

FIG. 14 is a diagram showing a color mask value table;

FIG. 15 is a diagram showing an order of printing of pixel arrays using a color ink;

FIG. 16 is a diagram showing an order of printing of the pixel arrays using the color ink according to a modified example.

DETAILED DESCRIPTION

Figure 1:
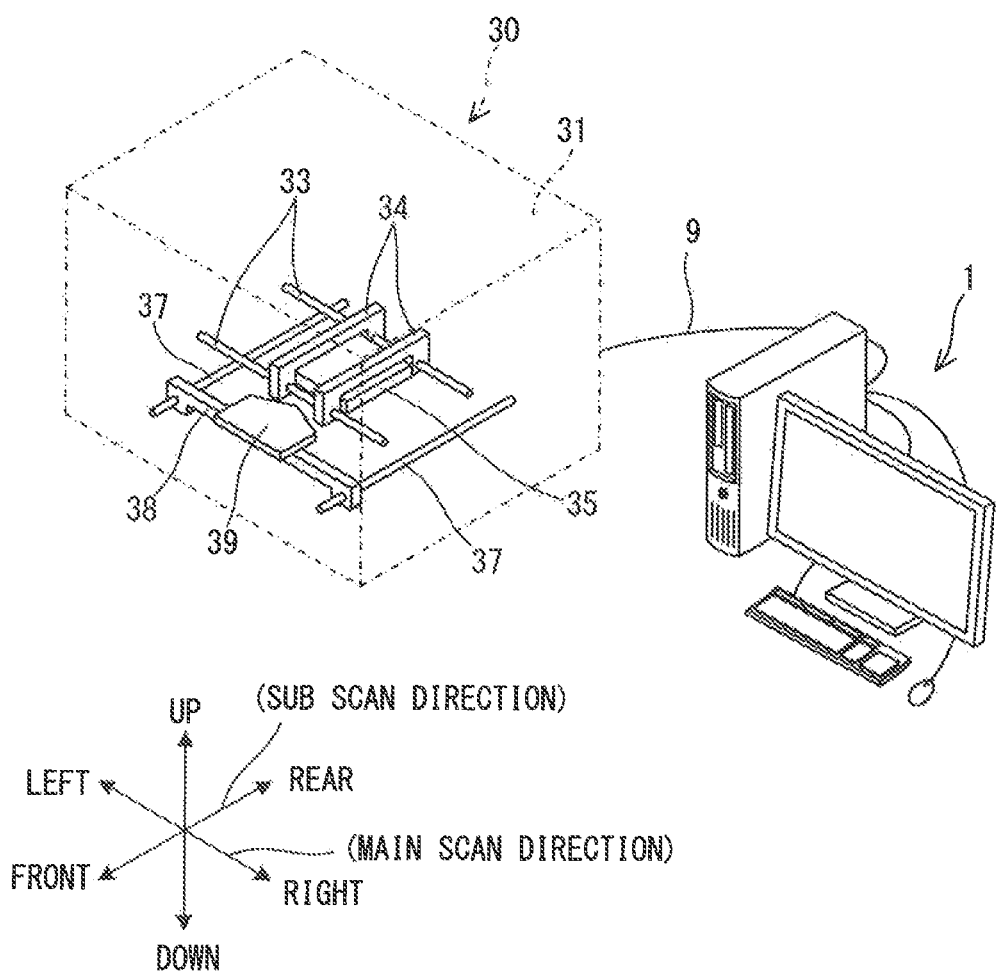
FIG. 1 is perspective view showing an outline configuration of a print device and a terminal device.

An embodiment of the present disclosure will be explained with reference to the drawings. A print device 30, which is an example of an image formation device, will be explained with reference to FIG. 1. The lower left side, the upper right side, the lower right side, the upper left side, the upper side and the lower side in FIG. 1 are, respectively, a front side, a rear side, a right side, a left side, an upper side, and a lower side of the print device 30. In the present embodiment, using an example in which a color ink is ejected onto an ink for a background (a white ink in the present embodiment), an algorithm will be explained that can reduce the possibility of a change in the hue of printing using the color ink when the printing by a multi-pass method is performed using the white ink. However, the present disclosure is not limited to this example, and the present algorithm can also be applied when the color ink only is printed by the multi-pass method.

Configuration of Print Device 30

The print device 30 is a known inkjet printer for use on cloth. The print device 30 prints an image on the cloth, which is a recording medium, by causing ejection heads 35 to perform scanning. A T-shirt or the like can be given as an example of the cloth. The print device 30 is connected to a terminal device 1, via a cable 9, for example. The terminal device 1 creates print data 421 in order to cause the print device 30 to perform print processing on the cloth. The print data 421 is transmitted from the terminal device 1 to the print device 30. The terminal device 1 is, for example, a personal computer (PC), a tablet, a high function mobile phone or the like.

A pair of guide rails 37 are provided in a lower portion inside a housing 31 of the print device 30. The pair of guide rails 37 extend in the front-rear direction. The pair of guide rails 37 support a platen support base 38 such that the platen support base 38 can move in the front-rear direction. A platen 39 is fixed to the platen support base 38, substantially in the center, in the left-right direction, of the top surface of the platen support base 38. The platen 39 is a plate body. The cloth is placed on the top surface of the platen 39. The platen support base 38 is conveyed in a sub scan direction by a sub-scan mechanism. The sub scan direction is the front-rear direction in which the cloth is conveyed by the platen 39. The sub-scan mechanism includes a sub-scan motor 47 (shown in FIG. 3), and a belt (not shown in the drawings).

Figure 2:
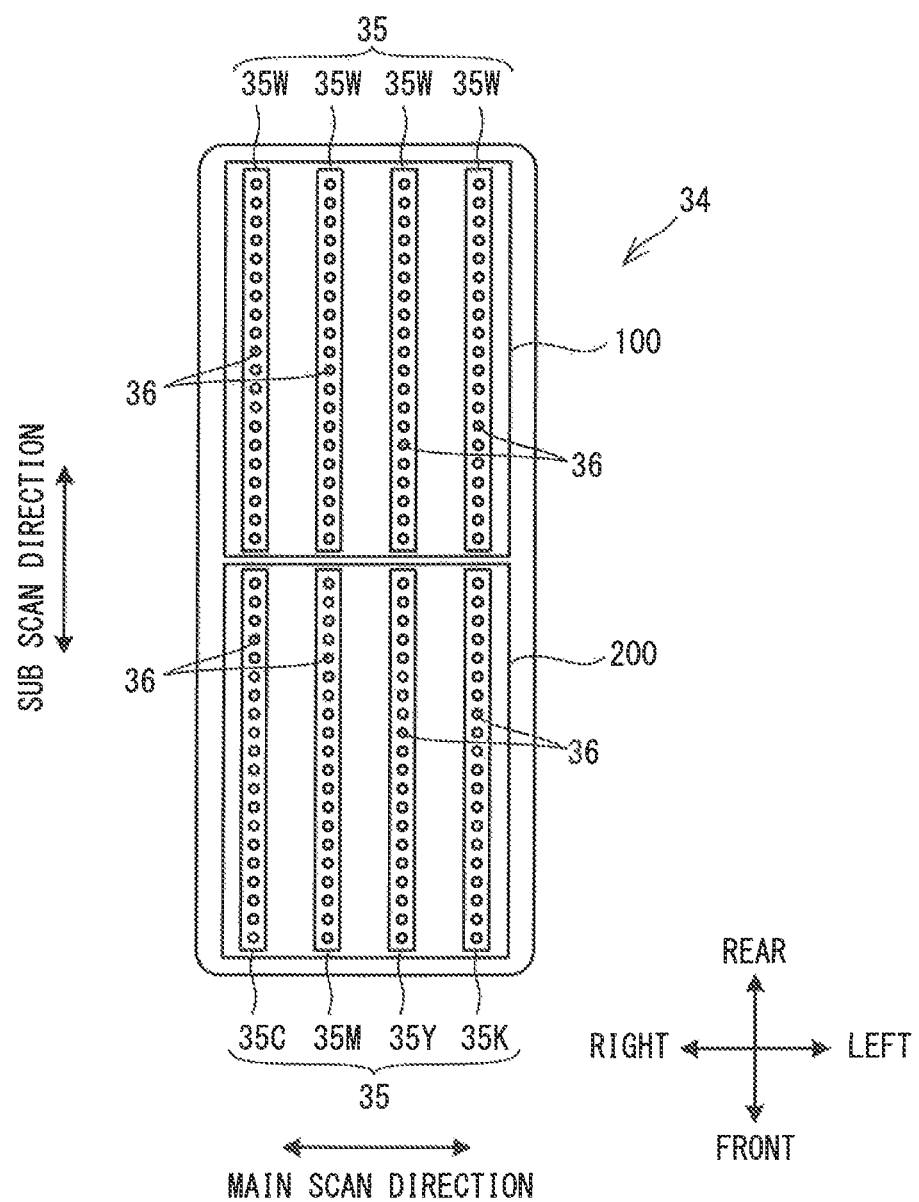
FIG. 2 is a bottom view showing an outline configuration of a carriage.

The print device 30 is provided with a pair of guide rails 33, inside the housing 31 and above the platen 39. The pair of guide rails 33 extend in the left-right direction. The pair of guide rails 33 support a carriage 34 such that the carriage 34 can move in the left-right direction. In an example shown in FIG. 2, a head unit 100 that is provided with four ejection heads 35W, and a head unit 200 that is provided with ejection heads 35C, 35M, 35Y, and 35K are mounted on the carriage 34. The carriage 34 is conveyed in a main scan direction, which is orthogonal to the sub scan direction, by a main scan mechanism. The main scan direction is the left-right direction in which the four ejection heads 53W, and the ejection heads 35C, 35M, 35Y, and 35K are conveyed by the carriage 34. The main scan mechanism includes a main scan motor 46 (shown in FIG. 3) and a belt (not shown in the drawings). In the following explanation, the four ejection heads 35W, and the ejection heads 35C, 35M, 35Y, and 35K are also referred to as the ejection heads 35. As shown in FIG. 2, a plurality of nozzles 36 are provided on a bottom surface of each of the ejection heads 35. The number of the plurality of nozzles 36 is, for example, 420. The 420 of the nozzles 36 are provided on each of the total of eight ejection heads 35. In FIG. 2, for simplification, a smaller number (namely, 20) of the nozzles 36 are shown than the actual number.

Each of the nozzles 36 can eject ink. Each of the nozzles 36 is arranged at an equal interval in the sub scan direction on the respective ejection heads 35. The distance between each of the nozzles 36 is $1/300$ (in), for example. Hereinafter, the distance between the nozzles 36 that are adjacent in the sub scan direction is denoted as D (in). When an image having a resolution R (dpi) of "1200 (dpi)" is formed, the distance D between each of the nozzles 36 and the resolution R (dpi) satisfy a relationship of R=4/D. In the present embodiment, an ink supply path 60 is connected to the front side of the ejection head 35W, and the ink is supplied to each of the nozzles 36. Although not described in detail here, the ink supplied to each of the nozzles 36 is ejected downward from each of the nozzles 36, by driving of a piezoelectric element or a heating element provided in each of the nozzles 36.

The four ejection heads 35W of the head unit 100 are mounted on the carriage 34 such that the four ejection heads 35W are arranged in the main scan direction. A layout orientation of each of the nozzles 36 of the four ejection heads 35W is along the sub scan direction. The four ejection heads 35W eject white ink from each of the nozzles 36. In the present embodiment, the white ink is an ink used for a background. The ejection heads 35C, 35M, 35Y, and 35K of the head unit 200 are mounted on the carriage 34 such that the ejection heads 35C, 35M, 35Y, and 35K are arranged in the main scan direction. A layout orientation of each of the nozzles 36 of the ejection heads 35C, 35M, 35Y, and 35K is along the sub scan direction. The ejection heads 35C, 35M, 35Y, and 35K eject color inks from each of the nozzles 36. The ejection head 35C ejects cyan ink from the nozzles 36. The ejection head 35M ejects magenta ink from the nozzles 36. The ejection head 35Y ejects yellow ink from the nozzles 36. The ejection head 35K ejects black ink from the nozzles 36.

Electrical Configuration

An electrical configuration of the print device 30 will be explained with reference to FIG. 3. The print device 30 is provided with a central processing unit (CPU) 40 that controls the print device 30. A read only memory (ROM) 41, a random access memory (RAM) 42, an application specific integrated circuit (ASIC) 43, a head drive portion 44, a motor drive portion 45, a display control portion 48, an operation processing portion 50, a universal serial bus (USB) interface 52, a temperature sensor 21, and a humidity sensor 22 are connected to the CPU 40 via a bus 55. An example of the temperature sensor 21 is a thermistor, and is provided inside the housing 31 of the print device 30. It is preferable that the temperature sensor 21 be provided in the vicinity of the ejection head 35 (namely, in the vicinity of each of the nozzles 36), for example. This is done in order to be able to detect the temperature, which affects the ink, as accurately as possible. The humidity sensor 22 is provided inside the housing 31 of the print device 30. It is preferable that the humidity sensor 22 be provided in the vicinity of the ejection head 35 (namely, in the vicinity of each of the nozzles 36), for example. This is done in order to be able to detect the humidity, which affects the ink, as accurately as possible. Depending on processing content to be described later, both the temperature sensor 21 and the humidity sensor 22 need not necessarily be provided, and it is sufficient if at least one of them is provided.

The ROM 41 stores a main program that controls operations of the print device 30, initial values, and the like. Further, the ROM 41 stores a line feed (LF) value table 411 (to be described later) shown in FIG. 13, and a color mask value table 413 (to be described later) shown in FIG. 14. The RAM 42 temporarily stores various data. The ASIC 43 controls the head drive portion 44, and the motor drive portion 45. The head drive portion 44 is connected to the ejection heads 53 that eject the ink. The head drive portion 44 drives the piezoelectric element or the heating element provided in each of the nozzles 36 of the ejection heads 35. The motor drive portion 45 drives the main scan motor 46 and the sub-scan motor 47. The main scan motor 46 moves the carriage 34 in the main scan direction. The sub-scan motor 47 moves the platen 39 in the sub scan direction. The display control portion 48 controls display of a display 49 in accordance with an instruction from the CPU 40. Various screens, messages, and the like relating to the operation of the print device 30, are displayed on the display 49. The operation processing portion 50 receives the input of an operation with respect to an operation panel 51. A user can input various pieces of information and instructions via the operation panel 51. The USB interface 52 connects the print device 30 to an external device, such as the terminal device 1. Note that, in place of the USB interface 52, the print device 30 may be provided with serial interface of another standard, and may be connected to the external device, such as the terminal device 1, via a serial cable of that standard. Further, the print device 30 may be provided with a wired and/or wireless communication module, and may be connected to the external device, such as the terminal device 1, via various types of network, such as the Internet, an intranet or the like.

Storage Areas of RAM 42

Figure 17:
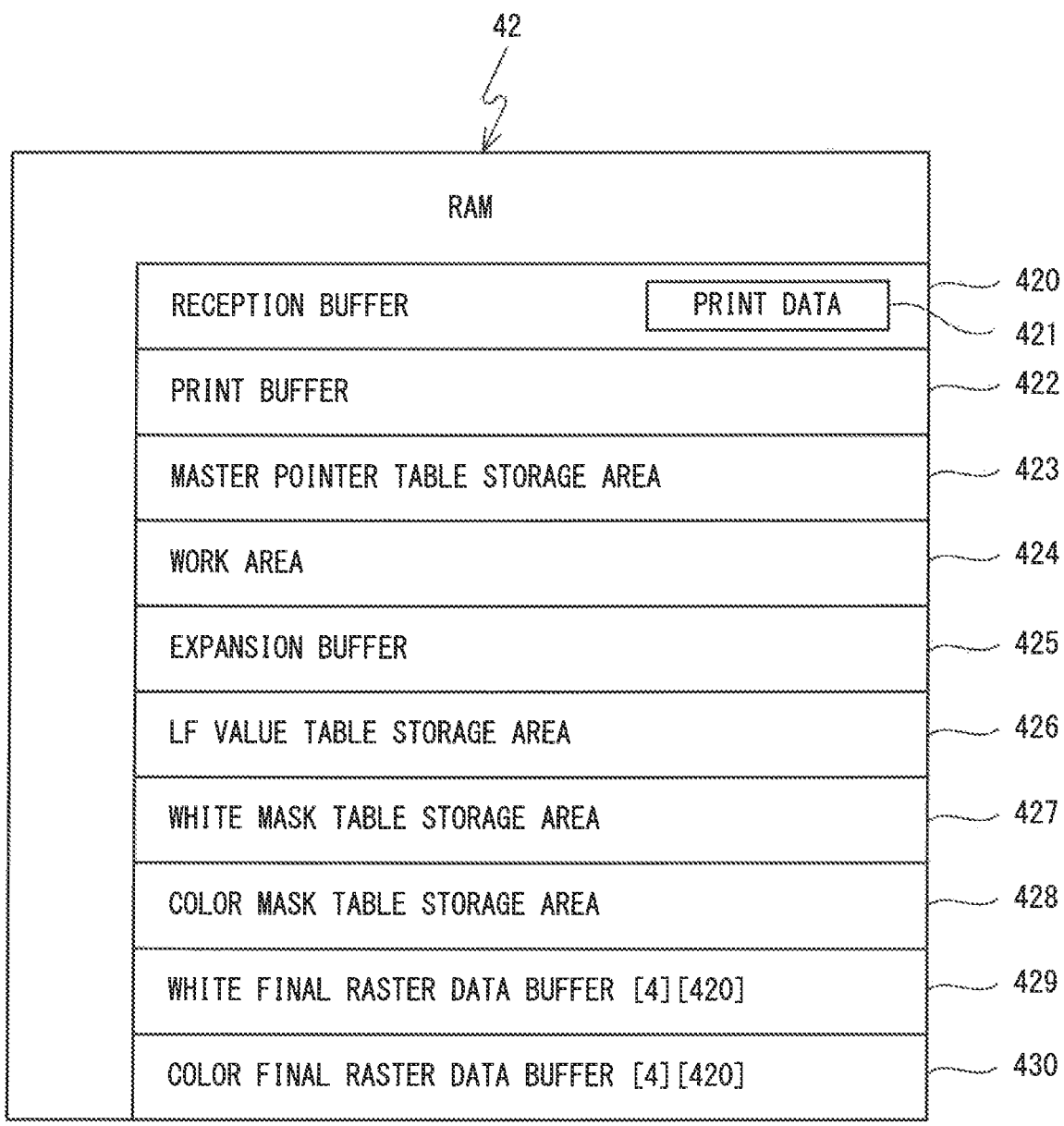
FIG. 17 is a conceptual diagram showing storage areas of a RAM.

Storage areas of the RAM 42 will be explained with reference to FIG. 17. The storage areas of the RAM 42 include a reception buffer 420, a print buffer 422, a master pointer table storage area 423, a work area 424, an expansion buffer 425, an LF table storage area 426, a white mask table storage area 427, a color mask table storage area 428, a white final raster data buffer 429, and a color final raster data buffer 430. The reception buffer 420 stores the print data 421 to be described later. The print buffer 422 and the master pointer table storage area 423A will be described later. The work area 424 temporarily stores various data. The expansion buffer 425 stores raster data expanded by processing at step S14 to be described later. The LF value table storage area 426 stores LF values, such as white LF values, acquired at steps S155, S157 and S158 of LF value acquisition processing to be described later. The white mask table storage area 427 stores white mask tables set at steps S104 and S111 of data acquisition processing to be described later. The color mask table storage area 428 stores color mask tables set at steps S107 and S114 of the data acquisition processing to be described later. The white final raster data buffer 429 stores white final raster data calculated at steps S105 and S112 of the data acquisition processing to be described later. The color final raster data buffer 430 stores color final raster data calculated at steps S108 and S115 of the data acquisition processing to be described later.

Overview of Operations of Print Device 30

Below, for ease of explanation, the movement of the platen 39 in the sub scan direction will be re-phrased as "the ejection heads 35 are moved relatively in the sub scan direction." Further, unless otherwise particularly specified, "the ejection heads 35 are moved relatively in the sub scan direction" indicates that "the ejection heads 35 move relatively toward the rear." In this case, in actuality, the platen 39 moves toward the front with respect to the carriage 34 on which the ejection heads 35 are mounted.

The print device 30 forms each of the pixel arrays by ejecting the ink from each of the nozzles 36 while causing the ejection head 35 to perform scanning in the main scan direction. More specifically, when 420 of the nozzles 36 are provided in the single ejection head 35, 420 rows of pixel arrays are formed on the cloth in the main scan direction by one cycle of main scan. The respective pixel arrays formed by one cycle of the main scan are formed at the interval D of the nozzles 36. When the formation of the pixel arrays by one cycle of the main scan is complete, the print device 30 causes the platen 39 to move in the sub scan direction, and once again forms pixel arrays by the main scan. The print device 30 repeatedly performs the above-described operations in accordance with the print data 421. Thus, the print device 30 forms a plurality of the pixel arrays while causing a single nozzle to scan a single pixel array once. The print device 30 repeats, four times, the movement of the platen 39 in the sub scan direction and the operation of ejecting the ink from the nozzles 36 while causing the ejection head 35 to perform the scanning in the main scan direction. Thus, the print device 30 forms an image in which ink dots are arranged in a lattice form at the intervals of D/4. Hereinafter, the printing method described above will be referred to as "normal printing."

In the normal printing, there are cases in which the ink ejection amount varies for each of the nozzles 36 when unstable ejection conditions, which will be described later, are satisfied. Further, there are cases in which the ejection direction of the ink varies for each of the nozzles 36. Further, there are also cases in which a relative movement amount of the ejection head 35 in the sub scan direction slightly varies. Therefore, if one pixel array is completed by one cycle of operation in the main scan direction, there are cases in which a gap (hereinafter referred to as "banding") occurs between the pixel arrays, and print quality deteriorates. Further, a difference in the amount of ink for each of the pixels causes a deterioration in the print quality.

Further, the CPU 40 can also cause the print device 30 to perform printing using a multi-pass method, which is one type of overlap printing. The printing of the multi-pass method is a method for performing printing by ejecting the ink while causing the different nozzles 36 of the ejection head 35 to perform a plurality of scans of each of the pixel arrays. By performing the printing of the multi-pass method, the print device 30 can reduce the variation in the ink ejection amount, in terms of a total amount of the ink ejected by causing the nozzles 36 to perform the plurality of scans. Further, by performing the printing of the multi-pass method, the print device 30 can improve the print quality by reducing the variation in the ejection direction of the ink. Generally, in the printing of the multi-pass method, thinning processing is performed. The thinning processing is processing that controls the ink ejection amount by thinning out the ink ejection with respect to the pixels in each of the plurality of main scans, in accordance with a predetermined algorithm. A rate at which the ink ejection is thinned out in each of the main scans is referred to as a thinning rate. Meanwhile, a ratio at which the ink ejection is performed on the pixels in each of the main scans is referred to as a mask percentage. Therefore, when a sum of the thinning rates in a plurality of main scans is 0%, a sum of the mask percentages is 100%. In the printing of the multi-pass method, which performs two scans of each of the pixel arrays using the different nozzles 36 of the ejection head 35, the relative movement amount of the ejection head 35 in the sub scan direction per a predetermined period of time is half of that of the normal printing. Thus, the print time is twice that of the normal printing.

Figure 4:
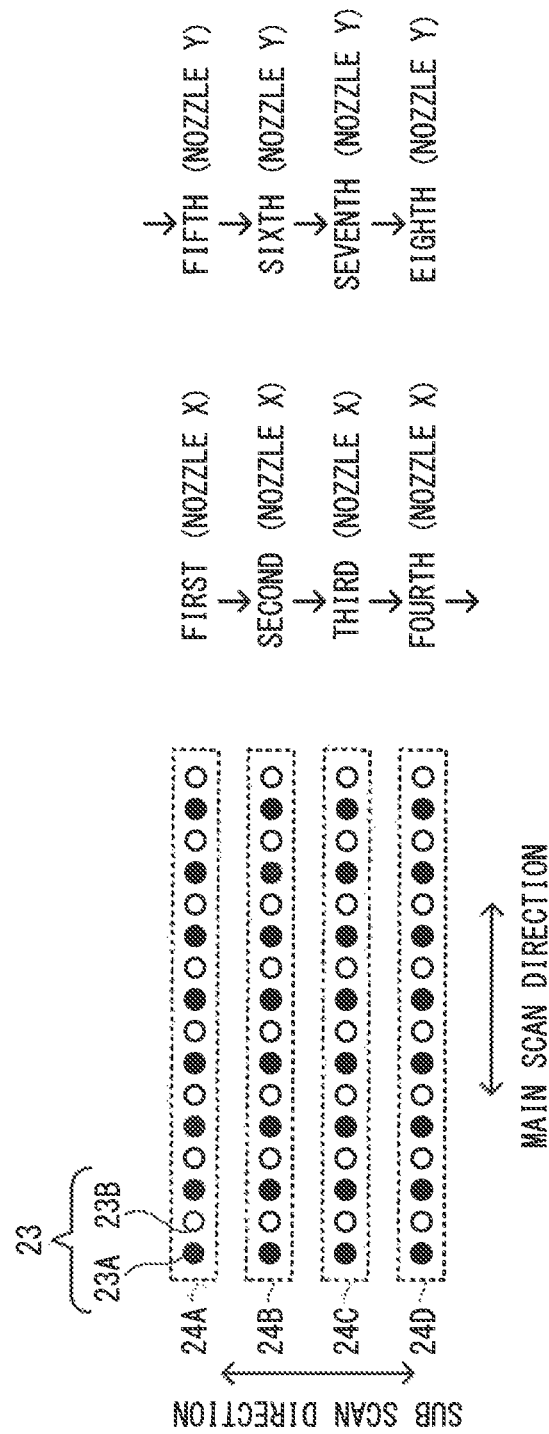
FIG. 4 is a diagram illustrating printing of a multi-pass method.

FIG. 4 illustrates a case in which four pixel arrays 24A, 24B, 24C and 24D formed by a plurality of pixels 23 of the ink are formed at the interval D/4 by the printing of the multi-pass method. In FIG. 4, for the purpose of explanation, formed pixels 23A are denoted as black circles, and pixels 23B are denoted as white circles. However, in actuality, all of them are pixels of the white ink. First, the CPU 40 causes the carriage 34 (refer to FIG. 2) to perform scanning once in the main scan direction, and ejects the white ink at a mask percentage of 50% from a specific nozzle X from among the plurality of nozzles 36, thus forming the pixel array 24A. In the example shown in FIG. 4, eight of the pixels 23A, which are odd number pixels, are formed from the left of the pixel array 24A. Next, the CPU 40 moves the platen 39 in the sub scan direction (specifically, to the rear in FIG. 2) with respect to the carriage 34, causes the carriage 34 to perform the scanning once in the main scan direction, and causes the white ink to be ejected from the nozzle X at the mask percentage of 50%, thus forming the pixel array 24B. In a similar manner, the eight odd-numbered pixels 23A are formed from the left of the pixel array 24B. The CPU 40 repeats the above-described operations, and forms the eight odd-numbered pixels 23A from the left in each of the four pixel arrays 24A to 24D.

Next, the CPU 40 further moves the platen 39 to the front in FIG. 2, causes the carriage 34 to perform the scanning once in the main scan direction, and causes the white ink to be ejected at the mask percentage of 50% onto the pixel array 24A from a nozzle Y, which is different from the nozzle X. As a result of the ejection, eight of the pixels 23B, which are even number pixels, are formed from the left of the pixel array 24A. Accordingly, sixteen of the pixels 23 are formed in the pixel array 24A. Next, the CPU 40 moves the platen 39 to the rear in FIG. 2, causes the carriage 34 to perform the scanning once in the main scan direction, and causes the white ink to be ejected from the nozzle Y at the mask percentage of 50%, thus forming the pixel array 24B. In a similar manner, the eight even-numbered pixels 23B are formed from the left of the pixel array 24B. The CPU 40 repeats the above-described operations, and forms the eight even-numbered pixels 23B from the left in each of the four pixel arrays 24A to 24D. Accordingly, sixteen of the pixels 23 are formed in each of the pixel arrays 24A to 24D.

As described above, in the printing of the multi-pass method, the different nozzles 36 perform the scanning of each of the four pixel arrays 24A to 24D. As a result, the mask percentage at which the white ink is ejected from the nozzle X and the nozzle Y is reduced to 50%, and the duty ratio of the driving waveform is reduced to half of that of the normal printing. Accordingly, it becomes easy to secure the time necessary for the meniscus to become stable before the next ejection. Therefore, the possibility is reduced that the normal ejection of the ink from the nozzles 36 is unable to be performed. Further, the impact caused by the variation of the ejection direction of the white ink is also reduced. In the present embodiment, the CPU 40 determines whether the unstable ejection conditions, which will be described later, are satisfied. When it is determined that the unstable ejection conditions are satisfied, the CPU 40 causes the printing to be performed by the multi-pass method even when the print data 421 includes a command to perform the normal printing.

Print Data

The print data 421 will be explained with reference to FIG. 5. The print data 421 is transmitted to the print device 30 from the terminal device 1 shown in FIG. 1, via the cable 9, for example. When the CPU 40 of the print device 30 receives the print data 421 via the cable 9, the CPU 40 stores the received print data 421 in the reception buffer 420 of the RAM 42. Based on the received print data 421, the CPU 40 forms at least one of the white ink image and the color ink image on the cloth, by executing main processing shown in FIG. 6 and FIG. 7 to be described later.

The print data 421 includes header information, raster information, and footer information. The header information includes the resolution, density information, platen information, and print method specification information. The resolution indicates the resolution R (dpi) of the image to be printed. Below, it is assumed that the resolution R is "1200 (dpi)." An explanation is made in which an example of the distance D between each of the nozzles 36 is "1/300 (in)" and satisfies a relationship of R=4/D. The density information indicates the density at which the white ink image is printed. The platen information indicates an area of the platen 39 supported by the platen support base 38, using coordinate information. The print method specification information indicates which of the following images is to be printed based on the print data 421: (1) only the white ink image is included; (2) only the color ink image is included; and (3) both the white ink image and the color ink image are included. Further, the print method specification information includes information that specifies that the printing is to be performed by the normal printing or the multi-pass method.

The raster information includes pixel array numbers, color information, a left margin, a right margin, and raster data. The pixel array number indicates a number ("1," "2," "3," . . . ) that is assigned, in order from the front side, to each of a plurality of pixel arrays aligned at the interval of 1/R in the sub scan direction. In other words, each of the pixel array numbers indicates a position at which a corresponding pixel array is formed on the print medium.

The color information is information indicating the color of the ink used to form the pixel array of the corresponding pixel array number. As the color information, in the present specific example, white 1 to 4, cyan, magenta, yellow, and black are associated with the pixel array numbers. One of the pixel arrays is formed by the ink being ejected from the total of the eight ejection heads 35, namely, from the four ejection heads 35W (white 1 to 4), and the ejection heads 35C (cyan), 35M (magenta), 35Y (yellow), and 35K (black). As a result, as shown in FIG. 5, the eight different pieces of color information (white 1 to 4, cyan, magenta, yellow, and black) are associated with each of the shared pixel array numbers "1", "2" . . . .

The left margin and the right margin are associated with the raster data, and are pieces of information to identify positions of the platen 39, based on encoders (not shown in the drawings) provided on the guide rails 33. The left margin indicates a position of the left end of the pixel array corresponding to the pixel array number, using a distance from the left end of the platen 39. The right margin indicates a position of the right end of the pixel array corresponding to the pixel array number, using a distance from the right end of the platen 39.

The raster data indicates whether or not to eject the ink from the nozzle 36 to form the pixel array by the main scan. The raster data is bit information in which one of "1" and "0" is arranged. The bit "1" of the raster data indicates that the ink dot is to be ejected from the nozzle 36. The bit "0" of the raster data indicates that the ink dot is not to be ejected from the nozzle 36.

Print Buffer

Figure 8:
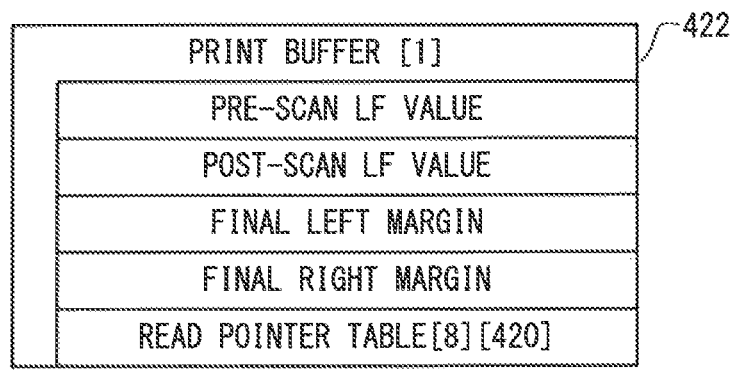
FIG. 8 is a diagram showing a print buffer [1]
Figure 10:
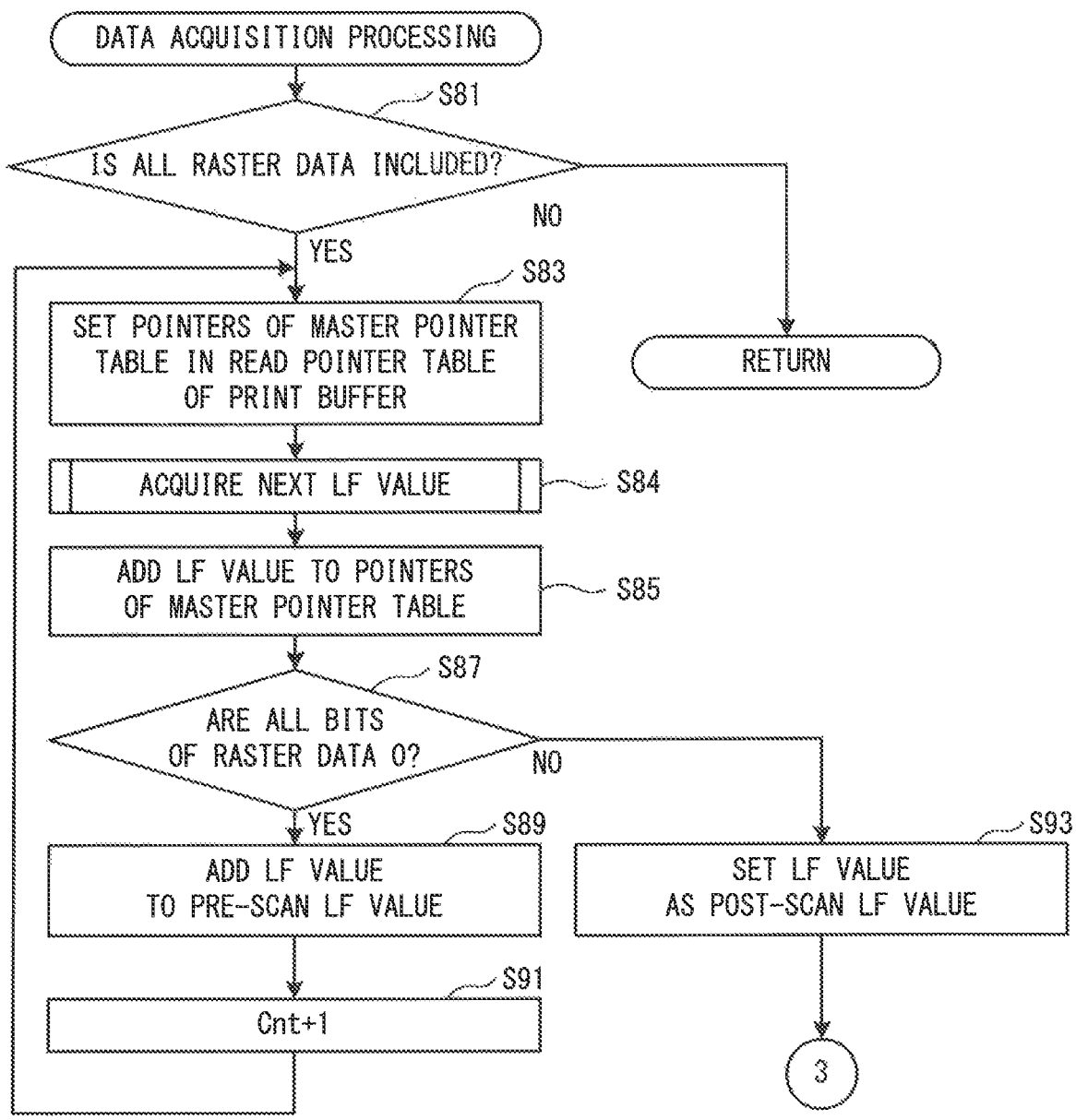
FIG. 10 is a flowchart of data acquisition processing.

The print buffer 422 will be explained with reference to FIG. 8. In the present embodiment, there are X (X=(R×D)+ (Ph−Pu)/100) print buffers 422 in the RAM 42. In the following explanation, the number X of the printer buffer 422 is represented as print buffer [X] 422. In FIG. 8, the print buffer [1] 422 is shown as an example of the print buffer [X] 422. A pre-scan LF value, a post-scan LF value, a final left margin, a final right margin, and a read pointer table [8] [420] are stored in the print buffer [1] 422. The pre-scan LF value, the post-scan LF value, the final left margin, and the final right margin will be explained later. 8×420 pointers included in a master pointer table 423 (to be described later) shown in FIG. 10 are stored in the read pointer table [8] [420]. As a result of initialization processing at step S1 in the main processing to be described later, the CPU 40 sets each of the pre-scan LF value, the post-scan LF value, the final left margin, and the final right margin to "0." Below, a subscript of each of the above-described white mask table and color mask table is referred to as an "index."

Main Processing

The main processing executed by the CPU 40 will be explained with reference to FIG. 6 to FIG. 14. When a power switch (not shown in the drawings) of the operation panel 51 shown in FIG. 2 is switched on, the CPU 40 reads a main program from the ROM 41, and executes the main processing.

Figure 6:
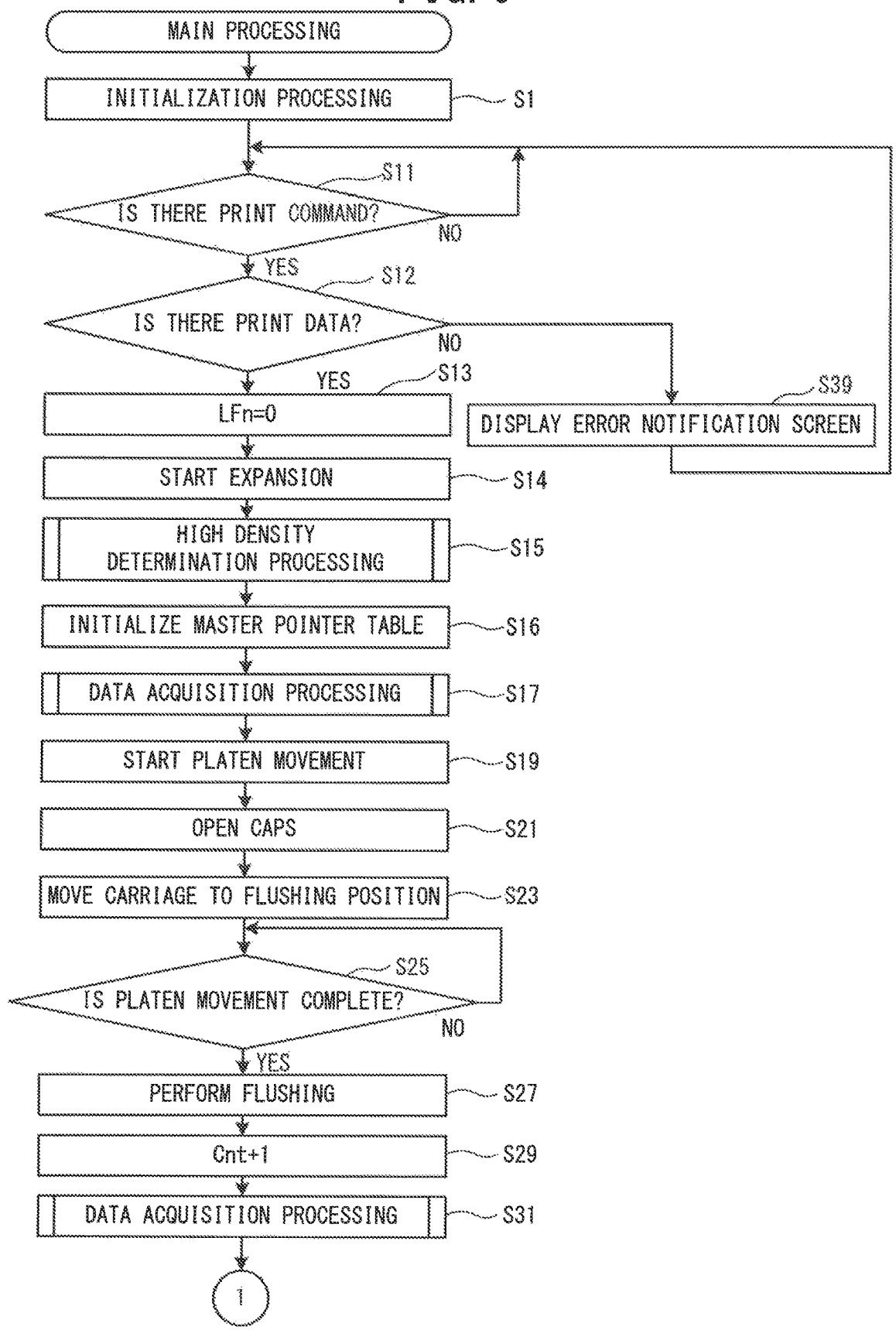
FIG. 6 is a flowchart of main processing.

As shown in FIG. 6, the CPU 40 first performs the initialization processing (step S1). An example of the initialization processing will be explained specifically. The CPU 40 sets a state in which all the ejection heads 35 are covered by caps. The CPU 40 arranges the carriage 34 in an initial position. The CPU 40 moves the platen 39 to a position furthermost to the rear side. The CPU 40 initializes variables stored in the RAM 42. For example, the CPU 40 sets a counter value "Cnt," which indicates a number of main scans (also including a number of times the main scan is not performed where all of the raster data is "0"), to "1." The counter value Cnt corresponds to the "X" of the print buffer [X] 422. The CPU 40 causes fields storing mask values of each of the white mask table [420] and the color mask table [420] (each of which consists of 420 rows of mask values) to be blank columns. The CPU 40 initializes the X number (X=1, 2, . . . ) of the print buffers [X] 422. In other words, as well as setting the pre-scan LF value, the post-scan LF value, the final left margin, and the final right margin to "0," the CPU 40 sets "0" for each of the fields storing the pointers of the read pointer table [8] [420].

As shown in FIG. 6, the CPU 40 determines whether a print command has been received (step S11). More specifically, for example, the CPU 40 determines that the print command has been received when a print button (not shown in the drawings) of the operation panel 51 shown in FIG. 3 has been depressed and a signal of the print command from the terminal device 1 has been received. When the CPU 40 determines that the print command has not been received (no at step S11), the CPU 40 returns the processing to step S11. The CPU 40 continues to monitor for the print command. When the CPU 40 determines that the print command has been received (yes at step S11), the CPU 40 advances the processing to step S12. The CPU 40 determines whether the print data 421 shown in FIG. 5 is stored in the reception buffer 420 (step S12). When the CPU 40 determines that the print data 421 is not stored in the reception buffer 420 (no at step S12), the CPU 40 displays an error notification screen, which indicates that the print data 421 is not stored in the reception buffer 420, on the display 49 shown in FIG. 3 (step S39). The CPU 40 returns the processing to step S11.

When the CPU 40 determines that the print data 421 is stored in the reception buffer 420 (yes at step S12), the CPU 40 sets "0" as a counter LFn that indicates the number of times of acquisition of the LF values stored in the work area 424 of the RAM 42 (step S13). The CPU 40 starts processing to expand the raster information of the print data 421 shown in FIG. 6 (step S14). The processing to expand the raster information is performed at the same time as the main processing, by separate processing that is performed in parallel with the main processing. The expanded raster information is stored in the expansion buffer 425 in the RAM 42. An index is attached to the raster information, and the CPU 40 refers to the index at the time of printing, using the pointers stored in the read pointer table [8] [420].

The CPU 40 initializes the master pointer table 423A (shown in FIG. 9), which is stored in the RAM 42 (step S16). More specifically, as shown in FIG. 9, head types, nozzles, and pointers are associated with each other in the master pointer table 423A. The head types indicate the total of eight ejection heads 35 (the four ejection heads 35W (white 1 to 4), the ejection head 35C (cyan), the ejection head 35M (magenta), the ejection head 35Y (yellow), and the ejection head 35K (black)) mounted on the carriage 34. The nozzles indicate the 420 nozzles 36 of each of the eight ejection heads 35 (hereinafter referred to as a nozzle [1], a nozzle [2], . . . a nozzle [420]). The pointer associated with each of the nozzles 36 is a pointer that indicates, among the raster information stored in the expansion buffer 425, the raster data for the corresponding nozzle 36 to form one row of the pixel array in the main scan direction.

As an example, as the pointer corresponding to the nozzle [1] of the head type "white 1" of the master pointer table 423A, the CPU 40 associates the pointer that indicates, from among the raster information stored in the expansion buffer 425, the raster data corresponding to the pixel array number "1" and to the color information "white 1." As the pointer corresponding to the nozzle [2] of the head type "white 1" of the master pointer table 423A, the CPU 40 associates the pointer that indicates, from among the raster information stored in the expansion buffer 425, the raster data corresponding to the pixel array number "5" and to the color information "white 1." The reason for this is that the distance between the nozzles 36 of the ejection heads 35W is D, which is four times the interval 1/R between the pixel arrays in the sub scan direction. Thus, the pixel array number corresponding to the nozzle [2] is 5 (4+1).

Below, as the pointers corresponding to the nozzles [n] (n=1, 2, . . . 420) of the head type "white 1" of the master pointer table 423A, the CPU 40 uses the same method to associate the pointers that indicate, from among the raster information, the raster data corresponding to the pixel array numbers "4 (n−1)+1" and to the color information "white 1." The CPU 40 associates the pointers corresponding to the nozzles [1] to [420] of the head types "white 2 to white 4" of the master pointer table 423 using the same method as that described above.

As the pointer corresponding to the nozzle [n] of the head type "cyan" of the master pointer table 423, the CPU 40 associates a pointer that indicates, from among the raster information stored in the expansion buffer 425, the raster data corresponding to the pixel array number "4 (420+n−1)+7086" and to the color information "cyan." The reason for adding "7086" is that a distance of separation between the nozzles 36 furthest to the rear of the four white ink ejection heads 35W shown in FIG. 2 and the nozzle 36 furthest to the rear of the cyan ink ejection head 35C is 150 mm in the present specific example. Thus, the pointers are set while taking into account a number of pixel arrays in the distance of separation. The value "7086" is derived by the expression "round {(150/25.4) (in)×1200 (dpi)}." The round is a function to round off a decimal point. For example, round (1.23)=1. Note that, when the pixel array number calculated by "4 (419+n)+7086" is a negative value, the CPU 40 associates a corresponding pointer of the master pointer table 423 with a pointer indicating raster data in which all of the bits are "0." In this case, the ejection of the cyan ink from the ejection head 35C is started after 7086 pixel arrays have been formed by the ejection of the white ink from the ejection heads 35W. Thus, the cyan ink is ejected so as to overlap with the formed white ink pixel arrays. Using the same method, the CPU 40 associates pointers of the master pointer table 423 corresponding to the nozzles [1] to [420] of the head types "magenta," "yellow," and "black."

Figure 11:
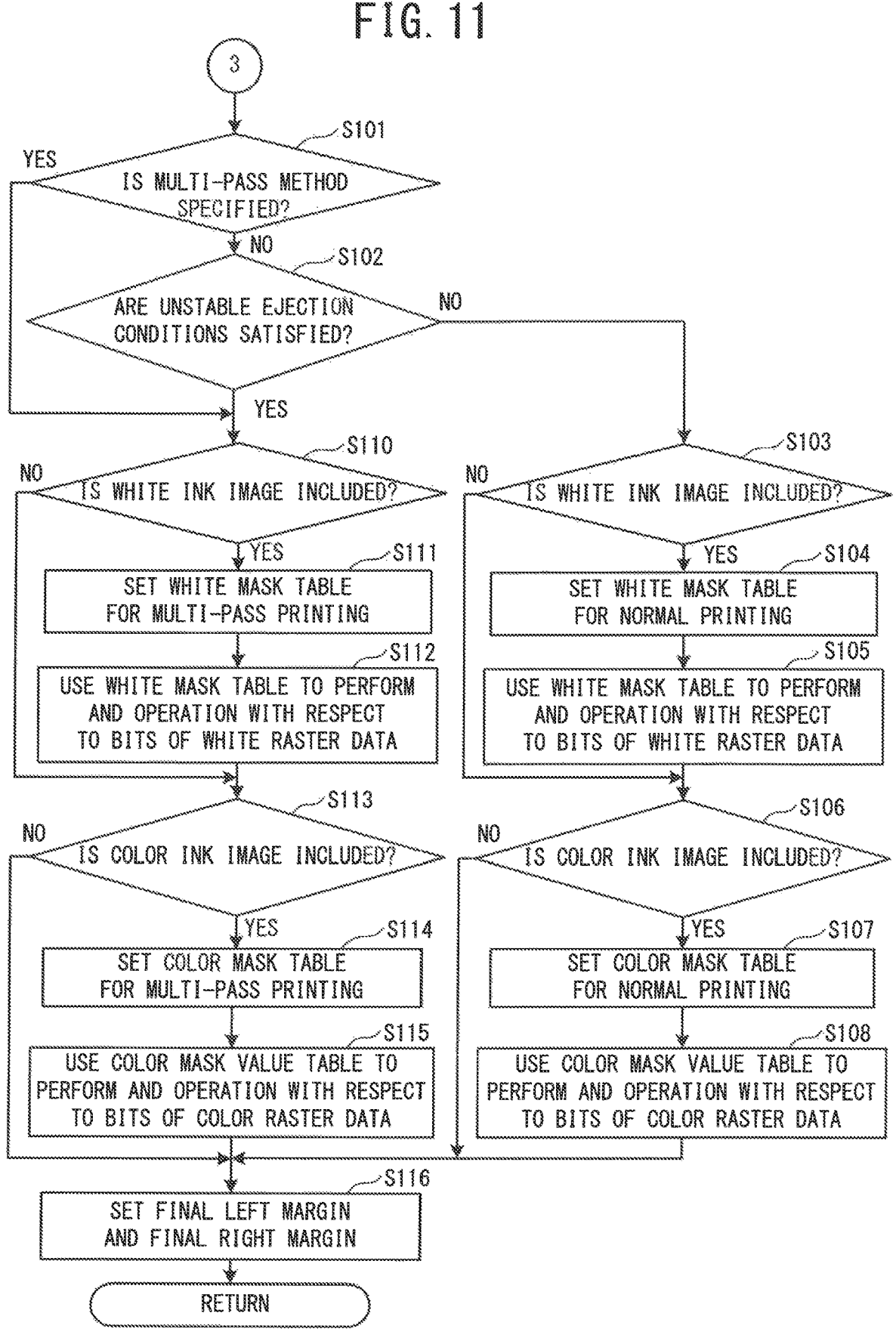
FIG. 11 is a flowchart of data acquisition processing and is a continuation of FIG. 10.

As shown in FIG. 6, after initializing the master pointer table 423A by the processing at step S16, the CPU 40 performs data acquisition processing shown in FIG. 10 and FIG. 11 (step S17).

The data acquisition processing will be explained with reference to FIG. 10 and FIG. 11. In the data acquisition processing, the CPU 40 stores, in the read pointer table [8] [420] of the print buffer [Cnt] 422, the pointer indicating the raster data to be used when causing the carriage 34 to move in the main scan direction for the Cnt-th time.

The CPU 40 determines whether all of the raster data indicated by the 8×420 pointers in the master pointer table 423A shown in FIG. 9 are included in the raster information stored in the expansion buffer 425 (step S81). When the CPU 40 determines that all the raster data are not included in the raster information (no at step S81), the CPU 40 ends the data acquisition processing. However, it is determined at step S12 of the main processing whether the print data is present, and the main processing from step S14 onward is performed only when the print data is determined to be present. Thus, at step S81 of the data acquisition processing, although a NO determination is not normal, if there is a particular abnormality, NO is determined.

When the CPU 40 determines that all the raster data are included in the raster information (yes at step S81), the CPU 40 advances the processing to step S83. The CPU 40 sets the 8×420 pointers of the master pointer table 423 as the read pointer table [8] [420] of the print buffer [Cnt] 422 (step S83). Next, the CPU 40 performs following LF value acquisition processing based on the LF value table 411 shown in FIG. 13 (step S84).

LF Value Table 411

The LF value table 411 stored in the ROM 41 will be explained with reference to FIG. 13. The LF value table 411 shown in FIG. 13 is an example when the number of the nozzles 36 is "420" and D×R pixels that are adjacent to each other in the sub scan direction (hereinafter referred to as adjacent D×R pixels) are adjacent four pixels. "D" represents the distance (in) between the nozzles 36 that are adjacent to each other in the sub scan direction, and "R" represents the resolution (dpi). In the LF value table 411, types and LF values are associated with each other. As the types, there are three types, i.e., white, white+color, and normal. The white type is associated with LF values (hereinafter, referred to as "white LF values") for the printing of a white ink image using the multi-pass method, and the white+color type is associated with LF values (hereinafter, referred to as "white+color LF values") for the printing of an image formed by a white ink image and a color ink image, using the multi-pass method. Further, the normal type is associated with LF values (hereinafter, referred to as "normal LF values") for the normal printing, not the printing of the multi-pass method. In the present specific example, the LF values are respectively associated with remainder values "1," "2," "3," "4," "5," "6," "7" and "0" obtained by dividing (LFn−1) by "8", where (LFn−1) is a value obtained by subtracting "1" from a counter value LFn that represents the number of times of acquisition of the LF values. The reason why the value (LFn−1) is divided by "8" is because, in the present embodiment, the adjacent four pixels are formed by two main scans on a forward path and a return path. Therefore, in the case of the adjacent D×R pixels, the LF values respectively corresponding to the remainders (1, 2, . . . , (2D×R−1), 0) obtained by dividing (LFn−1) by "2D×R" are set in advance.

Figure 12:
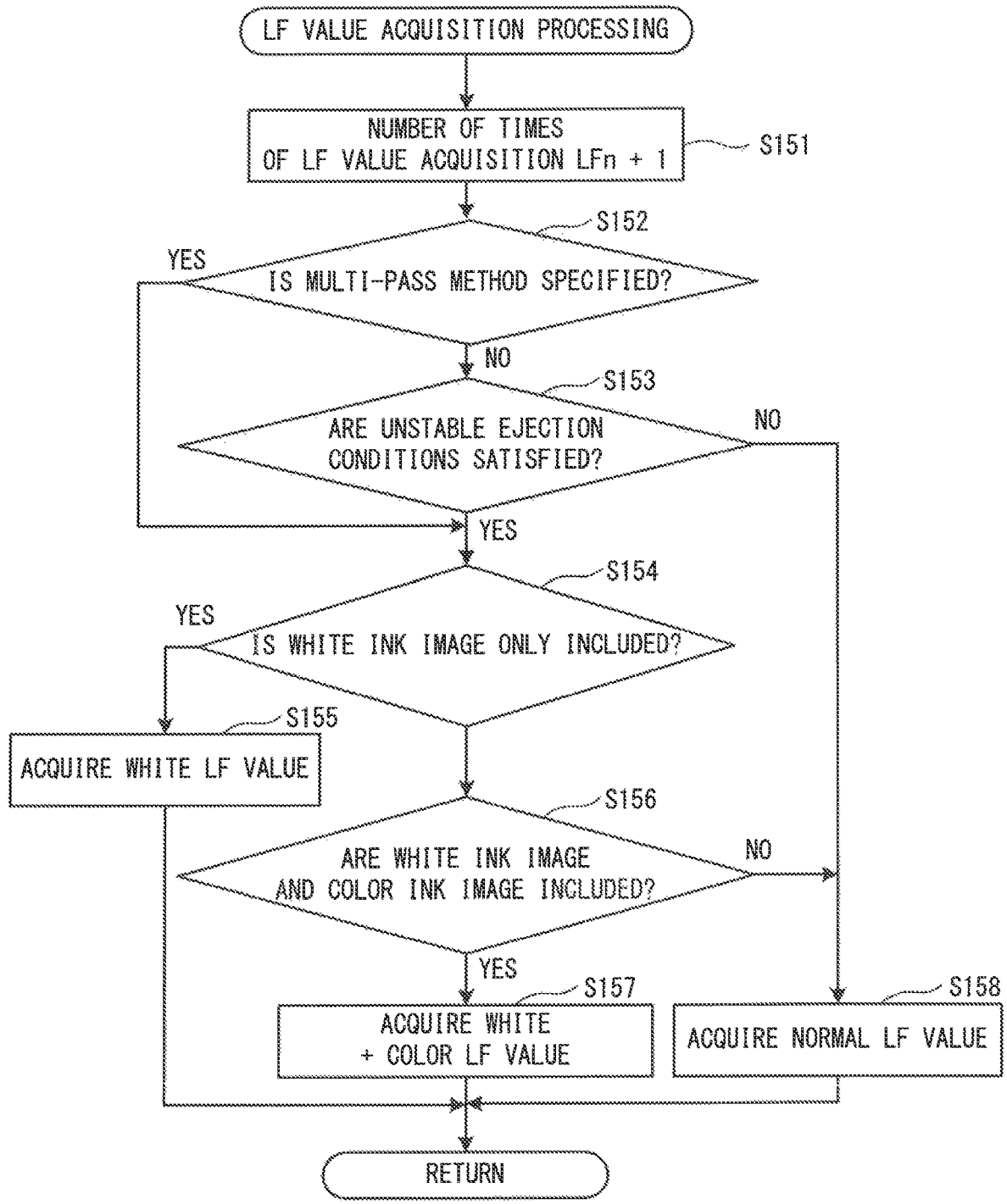
FIG. 12 is a flowchart of LF value acquisition processing.

Next, the LF value acquisition processing will be explained with reference to FIG. 12. The LF value acquisition processing is processing that corresponds to step S84 of the data acquisition processing.

The CPU 40 adds "1" to the counter value LFn that indicates the number of times of acquisition of the LF values stored in the work area 424 of the RAM 42, and thus updates the counter value LFn (step S151). Next, the CPU 40 determines whether the printing by the multi-pass method is specified in the print method specification information of the print data 421 (step S152). When it is not determined that the printing by the multi-pass method is specified in the print method specification information (no at step S152), the CPU 40 determines whether the unstable ejection conditions are satisfied (step S153).

Determination of Unstable Ejection Conditions

Here, a determination method of the unstable ejection conditions will be explained. When the unstable ejection conditions that will be explained below as specific examples are satisfied, there is a possibility that an ejection failure of the white ink from the nozzles 36 may occur. Hereinafter, the specific examples of the unstable ejection conditions will be explained. The CPU 40 determines whether the temperature detected by the temperature sensor 21 is equal to or less than a predetermined temperature, and when it is determined that the temperature is equal to or less than the predetermined temperature, the CPU 40 determines that the unstable ejection condition is satisfied. This is because, when the temperature becomes equal to or less than the predetermined temperature, the viscosity of the white ink increases. As a result, it takes time to form the meniscus, and the meniscus may not be maintained stably. Therefore, there is a possibility that ejection failure of the white ink may occur. The predetermined temperature is, for example, 15° C.

Further, the CPU 40 determines whether the amount of the white ink used for the printing of a piece of the print data 421 is equal to or more than a predetermined amount. When it is determined that the amount of the white ink used is equal to or more than the predetermined amount, the CPU 40 determines that the unstable ejection condition is satisfied. In principle, the unstable ejection condition should be determined based on the duty ratio of the driving waveform of the ejection of the white ink onto the print medium in one cycle of the main scan, rather than on the amount of the white ink used. However, when one row of pixel array is formed by the main scan, it is difficult to calculate the duty ratio of the driving waveform in advance of the printing based on the current print data 421. The CPU 40 can obtain, in advance, the amount of the white ink to be used for the printing of the print data 421 based on the print data 421. Therefore, the amount of ink used for the printing of a piece of the print data 421 is used as a substitute index. When the amount of ink used for the printing of the print data 421 is equal to or more than the predetermined amount, there is a high possibility that the duty ratio of the driving waveform to eject the ink becomes higher and the ejection interval of the ink becomes shorter. Therefore, it may become difficult to secure the time necessary for the meniscus to become stable before the next ejection. As a result, there is a possibility of occurrence of an ejection failure of the white ink. The predetermined amount is 5 ml, for example.

Further, the CPU 40 determines whether the ejection amount of the white ink from one of the nozzles 36 in one cycle of movement of the ejection head 35 in the main scan direction is equal to or more than a predetermined amount. When it is determined that the ejection amount is equal to or more than the predetermined amount, the CPU 40 determines that the unstable ejection condition is satisfied. When the ejection amount of the white ink from one of the nozzles 36 in one cycle of movement of the ejection head 35 in the main scan direction with respect to the print medium is equal to or more than the predetermined amount, the duty ratio of the driving waveform to eject the white ink from the nozzles 36 becomes higher, and the ejection interval of the ink becomes shorter. Therefore, it may become difficult to secure the time necessary for the meniscus to become stable before the next ejection of the ink. As a result, there is a possibility of occurrence of an ejection failure of the white ink. The predetermined amount is, for example, 50% of a maximum ink amount that can be ejected from one of the nozzles 36 in one cycle of movement of the ejection head 35 in the main scan direction.

Further, the CPU 40 determines whether the humidity detected by the humidity sensor 22 is equal to or less than a predetermined humidity. When it is determined that the detected humidity is equal to or less than the predetermined humidity, the CPU 40 determines that the unstable ejection condition is satisfied. When the humidity decreases, the drying of the white ink becomes faster and the viscosity of the white ink increases. As a result, it takes time to form the meniscus and the meniscus is not maintained stably. Therefore, there is a possibility that the ejection of the white ink from the nozzles 36 cannot be performed correctly. The predetermined humidity is 20%, for example.

Further, the CPU 40 may determine whether an elapsed time from a predetermined operation is equal to or more than a predetermined period of time. When it is determined that the elapsed time is equal to or more than the predetermined period of time, the CPU 40 may determine that the unstable ejection condition is satisfied. An example of the term "predetermined operation" is a previous printing operation or a maintenance operation or the like including at least one of purging that sucks the ink from the nozzles 36 using caps (not shown in the drawings) and a suction mechanism (not shown in the drawings), wiping that wipes off the ink adhered to the nozzles 36 of the ejection head 35 using a wiper, and flushing that ejects the ink from the nozzles 36. When the white ink is not ejected for a long time from the end of the printing operation or from the end of the maintenance operation, a pigment component of the white ink settles. Therefore, there is a possibility that the white ink cannot be ejected correctly. In the case of the printing operation, the amount of the white ink ejected is large, and the white ink whose pigment component has settled is sufficiently ejected from the nozzles 36. Therefore, in the case of the end of the printing operation, the predetermined period of time is 24 hours, for example. In contrast to this, in the case of the maintenance operation, the amount of the white ink ejected from the nozzles 36 is smaller than that of the printing operation. Therefore, in the case of the end of the maintenance operation, the predetermined period of time is 3 hours, for example.

Further, the CPU 40 stores, as a cumulative value, the amount of the white ink used within a predetermined period, in the work area 24 of the RAM 42, and determines whether the cumulative value is equal to or less than a predetermined cumulative value. When it is determined that the cumulative value is equal to or less than the predetermined cumulative value, the CPU 40 determines that the unstable ejection condition is satisfied. When the cumulative value within the predetermined period is equal to or less than the predetermined cumulative value, there is a possibility that the flow of the white ink may stagnate. Therefore, there is a possibility that the pigment component of the white ink may settle and that the white ink cannot be ejected correctly. The predetermined period is 9 hours, for example. The predetermined cumulative value is 30 ml, for example. In the determination processing at step S153 of the LF value acquisition processing, the CPU 40 may perform the determination of only one of the above-described unstable ejection conditions. Further, the CPU 40 may perform the determination of a plurality of the above-described unstable ejection conditions, and when at least one of the unstable ejection conditions is satisfied, the CPU 40 may determine that the unstable ejection conditions are satisfied. Note that the unstable ejection conditions listed above are only an example, and the unstable ejection conditions include all conditions under which the ejection of the white ink may not be performed correctly.

In the LF value acquisition processing, when it is determined that the unstable ejection conditions are satisfied (yes at step S153), the CPU 40 determines whether the print method specification information includes information indicating that (1) only a white ink image is included (step S154). When it is determined that the print method specification information includes the information indicating that (1) only the white ink image is included (yes at step S154), the CPU 40 acquires the white LF value from the LF value table 411 shown in FIG. 13 (step S155). More specifically, the CPU 40 calculates the remainder when (LFn−1) is divided by "8." Then, the CPU 40 acquires the white LF value corresponding to the calculated remainder, and stores the acquired white LF value in the LF value table storage area 426 of the RAM 42. In the determination processing at step S154, when the CPU 40 does not determine that the print method specification information includes the information indicating that (1) only the white ink image is included (no at step S154), the CPU 40 determines whether the print method specification information includes information indicating that (3) the white ink image and the color ink image are included (step S156).

When the CPU 40 determines that the print method specification information includes the information indicating that (3) the white ink image and the color ink image are included (yes at step S156), the CPU 40 acquires the white+color LF value from the LF value table 411 shown in FIG. 13 (step S157). More specifically, the CPU 40 calculates the remainder when (LFn−1) is divided by "8." Then, the CPU 40 acquires the white+color LF value corresponding to the calculated remainder, and stores the acquired white+color LF value in the LF value table storage area 426 of the RAM 42. In the determination processing at step S156, when the CPU 40 does not determine that the print method specification information includes the information indicating that (3) the white ink image and the color ink image are included (no at step S156), the CPU 40 acquires the normal LF value from the LF value table 411 shown in FIG. 13 (step S158). More specifically, the CPU 40 calculates the remainder when (LFn−1) is divided by "8." Then, the CPU 40 acquires the normal LF value corresponding to the calculated remainder, and stores the acquired normal LF value in the LF value table storage area 426 of the RAM 42.

In the determination processing at step S152, when the CPU 40 determines that the print method specification information specifies the printing by the multi-pass method (yes at step S152), the CPU 40 performs processing at step S154 onward in the same manner as described above. After completion of one of the steps S155, S157 and S158, the CPU 40 advances the processing to step S85 of the data acquisition processing shown in FIG. 10. The CPU 40 adds the LF value acquired by the LF value acquisition processing to the 8×420 pointers of the master pointer table 423A shown in FIG. 9 (step S85). Since the LF value corresponds to the number of pixels, by the processing at step S85, the 8×420 pointers of the master pointer table 423A indicate the raster data separated by the LF value.

The CPU 40 identifies the 8×420 pieces of raster data indicated by the 8×420 pointers set in the read pointer table [8] [420] of the print buffer ([Cnt] 422 in the processing at step S83. Then, the CPU 40 determines whether all of the bits of the identified 8×420 pieces of raster data are "0" (S87). When the CPU 40 determines that all the bits of the 8×420 pieces of raster data are "0" (yes at step S87), the CPU 40 adds the LF value acquired by the LF value acquisition processing to the pre-scan LF value of the print buffer [Cnt] 422 (step S89).

The CPU 40 adds "1" to the counter value Cnt and updates the counter value Cnt (step S91). The CPU 40 returns the processing to step S83. On the other hand, when the CPU 40 determines that all the bits of the 8×420 pieces of raster data are not "0" (no at step S87), the CPU 40 sets the LF value acquired by the LF value acquisition processing as the post-scan LF value of the print buffer [Cnt] 422 (step S93). The CPU 40 advances the processing to step S101 shown in FIG. 11. The pre-scan LF value and the post-scan LF value calculated by the processing at steps S83 to S93 are used to skip the row in which the pixel array is not formed, and to identify a position after the movement when relatively moving the carriage 34 in the sub scan direction to the row in which the pixel array is formed.

As shown in FIG. 11, the CPU 40 determines whether the print method specification information of the print data 421 specifies the printing by the multi-pass method (step S101). When it is determined that the print method specification information specifies the printing by the multi-pass method (yes at step S101), the CPU 40 advances the processing to step S110. When it is not determined that the print method specification information specifies the printing by the multi-pass method (no at step S101), the CPU 40 determines whether the unstable ejection conditions are satisfied (step S102). Since the determination processing at step S102 is the same as the determination processing at step S153 of the above-described LF value acquisition processing, an explanation thereof is omitted here. When it is determined that the unstable ejection conditions are satisfied (yes at step S102), the CPU 40 advances the processing to step S110. Further, when it is not determined that the unstable ejection conditions are satisfied (no at step S102), the CPU 40 advances the processing to step S103.

At step S110, the CPU 40 determines whether the information indicating that the white ink image is included, is included as the print method specification information (step S110). The information indicating that the white ink image is included is one of the information indicating that (1) only the white ink image is included and the information indicating that (3) the white ink image and the color ink image are included. When it is determined that the information indicating that the white ink image is included, is included as the print method specification information (yes at step S110), the CPU 40 advances the processing to step S111. When it is not determined that the information indicating that the white ink image is included is included as the print method specification information (no at step S110), the CPU 40 advances the processing to step S113. At step S111, the CPU 40 sets the white mask tables for the multi-pass printing stored in the white mask table storage area 427 of the RAM 42 (step S111). More specifically, the CPU 40 sets, as mask values, "0xaaaa" ("1010101010101010") in the white mask tables [1] to [210] stored in the RAM 42, and sets, as mask values, "0x5555" ("0101010101010101") in the white mask tables [211] to [420].

Next, the CPU 40 advances the processing to step S112. The CPU 40 performs an AND operation on the bits of the white raster data using the white mask table (step S112). More specifically, the CPU 40 identifies the 8×420 pieces of raster data indicated by the 8×420 pointers set in the read pointer table [8] [420] of the print buffer [Cnt] 422. From among the identified raster data, the CPU 40 selects 4×420 pieces of the raster data corresponding to the four ejection heads 35W that eject the white ink. The CPU 40 performs the AND operation of the bits of each of the raster data corresponding to the nozzles [1] to [210] from among the selected 4×420 pieces of raster data, and the mask values (0xaaaa) set for each of the white mask tables [1] to [210]. Further, the CPU 40 performs the AND operation of the bits of each of the raster data corresponding to the nozzles [211] to [420] from among the selected 4×420 pieces of raster data, and the mask values (0x5555) set for each of the white mask tables [211] to [420]. When the number of bits of the raster data is larger than "16," the CPU 40 repeatedly applies the mask values set in the white mask tables, from the first value, to the bits from the $17^{th}$ bit of the raster data onward, and performs the AND operation. The CPU 40 stores the results of the AND operation in the white final raster data buffer [4] [420] 429 provided inside the RAM 42. Next, the CPU 40 advances the processing to step S113.

The CPU 40 determines whether the print method specification information includes information indicating that the color ink image is included (step S113). The information indicating that the color ink image is included is one of the information indicating that (2) only the color ink image is included, and the information indicating that (3) the white ink image and the color ink image are included. When it is determined that the print method specification information includes the information indicating that the color ink image is included (yes at step S113), the CPU 40 advances the processing to step S114.

Based on the color mask value table 413 shown in FIG. 14, the CPU 40 performs settings of the color mask tables for the multi-pass printing stored in the color mask table storage area 428 of the RAM 42 (step S114).

Color Mask Value Table 413

Here, the color mask value table 413 stored in the ROM 41 will be explained with reference to FIG. 14. FIG. 14 is an example of the color mask value table 413 when the resolution is 1200 (dpi) and the adjacent pixels are the adjacent four pixels. In the color mask value table 413, the resolution, a white ink printing method, and color mask values are associated with each other. The white ink printing method has two types, i.e., the normal printing and the multi-pass method. The mask values in the fields of the normal printing are color mask values when the normal printing is performed using the white ink. The mask values in the fields of the multi-pass method are color mask values when the printing is performed by the multi-pass method using the white ink. The color mask values are respectively associated with the remainder values "1," "2," "3," "4," "5," "6," "7" and "0" obtained by dividing (LFn−1) by "8." All of the mask values in the fields of the normal printing are "0xffff" ("1111111111111111"). Further, "0xffff" ("1111111111111111") and 0 are alternately set as the mask values in the fields of the multi-pass method. Therefore, when the white ink is printed by the multi-pass method, by referring to the color mask value table 413, the CPU 40 can set "0xffff" ("1111111111111111") or "0" ("0000000000000000") in the color mask tables [1] to [420] stored in the color mask table storage area 428 of the RAM 42, corresponding to the remainder values "1," "2," "3," "4," "5," "6," "7" and "0" obtained by dividing (LFn−1) by "8." In this case "0xffff" ("1111111111111111") is set for all the color nozzles [1] to [420] on the forward path of the ejection head 35 in the main scan direction, and "0" ("0000000000000000") is set for all the color nozzles [1] to [420] on the return path of the ejection head 35 in the main scan direction after the ejection head 35 has been relatively moved in the sub scan direction by the LF value.

In the data acquisition processing, the CPU 40 performs the AND operation on the bits of the color raster data using the color mask value table (step S115). More specifically, the CPU 40 identifies the 8×420 pieces of raster data indicated by the 8×420 pointers set in the read pointer table [8] [420] of the print buffer [Cnt] 422. From among the identified raster data, the CPU 40 selects 4×420 pieces of the raster data corresponding to the four ejection heads 35C, 35M, 35Y and 35K that eject the color inks. The CPU 40 performs the AND operation of the bits of each of the raster data corresponding to the nozzles [1] to [420] from among the selected 4×420 pieces of raster data, and the mask values set for each of the color mask tables [1] to [420]. When the number of bits of the raster data is larger than "16," the CPU 40 repeatedly applies the mask values set in the color mask tables, from the first value, to the bits from the $17^{th}$ bit of the raster data onward, and performs the AND operation. The CPU 40 stores the results of the AND operation in the color final raster data buffer [4] [420] 430 provided inside the RAM 42. Next, the CPU 40 advances the processing to step S116.

The CPU 40 sets a final left margin and a final right margin (step S116). More specifically, the CPU 40 identifies the 8×420 pieces of raster data indicated by the 8×420 pointers set in the read pointer table [8] [420] of the print buffer [Cnt] 422. From the raster information stored in the expansion buffer 425, the CPU 40 extracts all the left margins and the right margins associated with the identified raster data. The CPU 40 sets the smallest left margin among all the left margins, as the final left margin of the print buffer [Cnt] 422. Further, the CPU 40 sets the smallest right margin among all the right margins, as the final right margin of the print buffer [Cnt] 422. The CPU 40 ends the data acquisition processing, and advances the processing to step S19 of the main processing shown in FIG. 6.

When the CPU 40 determines at step S102 that the unstable ejection conditions are satisfied (yes at step S102), the CPU 40 determines whether the information indicating that the white ink image is included, is included as the print method specification information of the header information (step S103). The determination processing at step S103 is the same as the determination processing at step S110. When it is determined that the print method specification information includes the information indicating that the white ink image is included (yes at step S103), the CPU 40 advances the processing to step S104. When it is not determined that the print method specification information includes the information indicating that the white ink image is included (no at step S103), the CPU 40 advances the processing to step S106. At step S104, the CPU 40 sets a normal printing white mask table stored in the white mask table storage area 427 of the RAM 42 (step S104). More specifically, the CPU 40 sets "0xffff" ("1111111111111111") in the normal printing white mask tables [1] to [420], as mask values.

Next, the CPU 40 performs the AND operation on the bits of the white raster data using the white mask table (step S105). More specifically, the CPU 40 identifies the 8×420 pieces of raster data indicated by the 8×420 pointers set in the read pointer table [8] [420] stored in the print buffer [Cnt] 422. From among the identified raster data, the CPU 40 selects 4×420 pieces of the raster data corresponding to the four ejection heads 35W that eject the white ink. The CPU 40 performs the AND operation of the bits of each of the selected 4×420 pieces of raster data and the mask values (0xffff) set for each of the white mask tables [1] to [420]. When the number of bits of the raster data is larger than "16," the CPU 40 repeatedly applies the mask values set in the white mask tables, from the first value, to the bits from the $17^{th}$ bit of the raster data onward, and performs the AND operation. The CPU 40 stores the results of the AND operation in the white final raster data buffer [4] [420] 429 provided inside the RAM 42. Next, the CPU 40 advances the processing to step S106.

The CPU 40 determines whether the print method specification information includes the information indicating that the color ink image is included (step S106). The determination processing at step S106 is the same as the above-described determination processing at step S113. When it is determined that the print method specification information includes the information indicating that the color ink image is included (yes at step S106), the CPU 40 sets a normal printing color mask table stored in the color mask table storage area 428 of the RAM 42 (step S107). More specifically, as shown in FIG. 14, the mask values in the normal printing fields are all "0xffff" ("1111111111111111"). Therefore, the CPU 40 sets "0xffff" ("1111111111111111") in the color mask tables [1] to [420] stored in the color mask table storage area 428 of the RAM 42.

The CPU 40 performs the AND operation on the bits of the color raster data using the color mask value table (step S108). Step S108 is the same as step S115 described above. Therefore, a detailed explanation thereof is omitted here. The CPU 40 stores the results of the AND operation in the color final raster data buffer [4] [420] 430 provided inside the RAM 42. Next, the CPU 40 advances the processing to step S116 described above. Further, in the determination processing at step S106, when it is not determined that the print method specification information includes the information indicating that the color ink image is included (no at step S106), the CPU 40 advances the processing to step S116 described above. After performing step S116, the CPU 40 ends the data acquisition processing and advances the processing to step S19 of the main processing shown in FIG. 6.

The CPU 40 starts the movement of the platen 39 to a print start position (step S19). More specifically, the CPU 40 starts the movement of the platen 39 by an amount corresponding to the pre-scan LF value of the print buffer [Cnt=1]. The CPU 40 opens the caps covering the 420 nozzles 36 of each of the four ejection heads 35W, and the ejection heads 35C, 35M, 35Y, and 35K (step S21). The CPU 40 moves the carriage 34 to a flushing position (step S23). The flushing position is a position at which a flushing receptacle (not shown in the drawings) is provided.

The CPU 40 determines whether the movement of the platen 39 by the amount corresponding to the pre-scan LF value started by the processing at step S19 is complete (step S25). When the CPU 40 determines that the movement of the platen 39 by the amount corresponding to the pre-scan LF value is not complete (no at step S25), the CPU 40 returns the processing to step S25. The CPU 40 continuously monitors whether the movement of the platen 39 by the amount corresponding to the pre-scan LF value is complete. When the CPU 40 determines that the movement of the platen 39 by the amount corresponding to the pre-scan LF value is complete (yes at step S25), flushing processing is performed (step S27).

The CPU 40 adds "1" to the counter value Cnt and updates the counter value Cnt (step S29). Based on the updated counter value Cnt to which "1" has been added, the CPU 40 performs the data acquisition processing shown in FIG. 10 and FIG. 11 (step S31). The data acquisition processing is the same as the data acquisition processing performed at step S17 shown in FIG. 6, and an explanation thereof is thus omitted here. The CPU 40 advances the processing to step S41 shown in FIG. 7.

Figure 7:
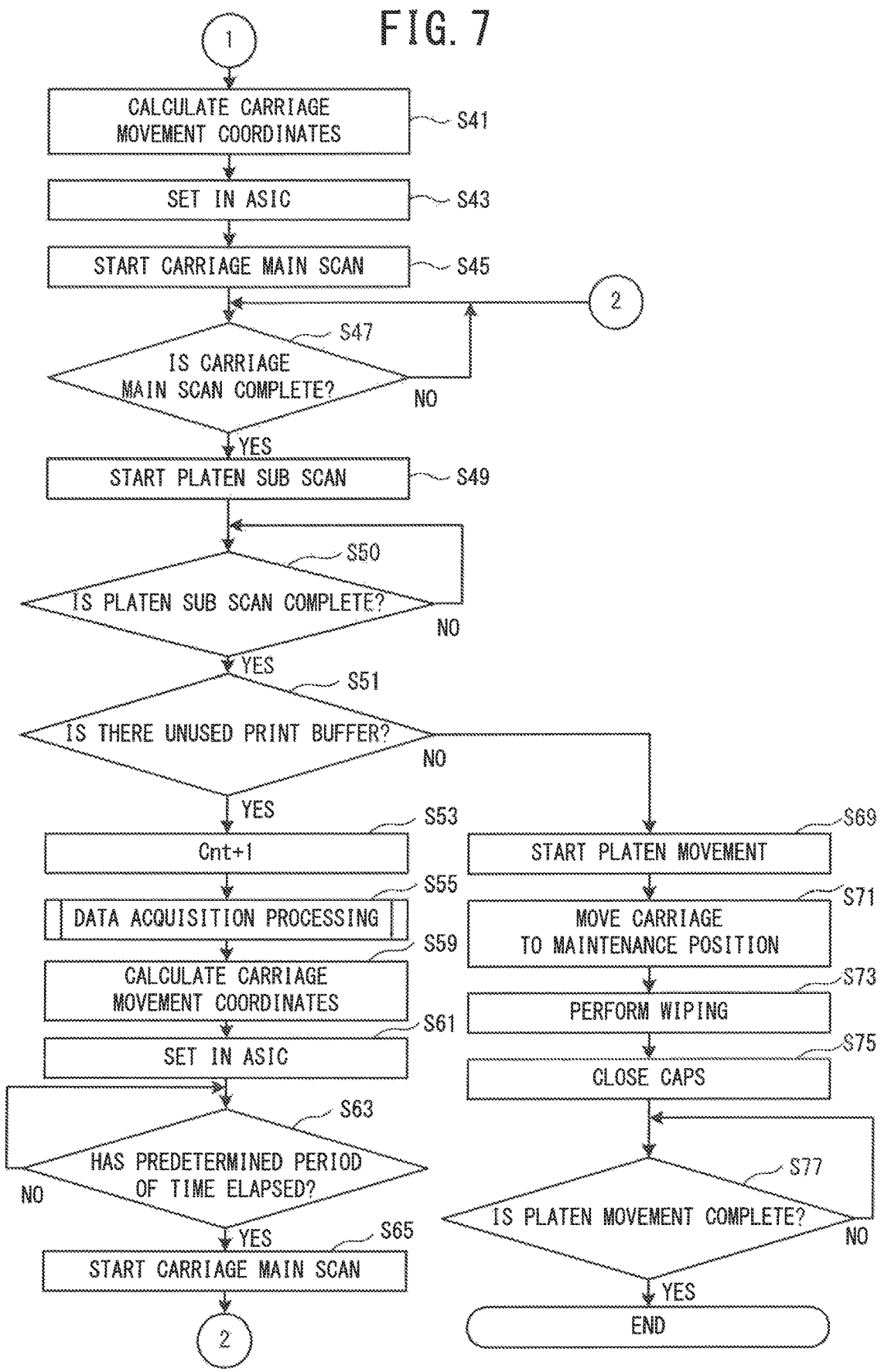
FIG. 7 is a flowchart of the main processing and is a continuation of FIG. 6.

As shown in FIG. 7, the CPU 40 calculates coordinates of each of positions indicated by the final left margin and the final right margin, as coordinates of a movement origin and a movement destination of the carriage 34 (step S41). More specifically, the CPU 40 acquires the final left margin and the final right margin of each of the print buffer [Cnt−1] 422 and the print buffer [Cnt] 422. The CPU 40 selects the smaller of the final left margins of the print buffer [Cnt−1] 422 and of the print buffer [Cnt] 422, as the final left margin. Similarly, the CPU 40 selects the smaller of the final right margins of the print buffer [Cnt−1] 422 and of the print buffer [Cnt] 422, as the final right margin. In this way, the movement of the carriage 34 can be optimized. The CPU 40 calculates, as the coordinates of the movement origin and the movement destination of the carriage 34, the coordinates of each of the positions represented by the selected final left margin and final right margin. Next, the CPU 40 sets the calculated coordinates, the read pointer table [8] [420] of the print buffer [Cnt] 422, and the main scan direction, as a print direction, in a storage portion of the ASIC 43 (step S43).

By outputting a signal to the ASIC 43, the CPU 40 starts movement of the carriage 34 in the main scan direction (step S45). More specifically, the ASIC 43 controls the head drive portion 44 and the motor drive portion 45 shown in FIG. 3. As a result of the control of the ASIC 43, the motor drive portion 45 starts the movement of the carriage 34 in the main scan direction. As a result of the control of the ASIC 43, the head drive portion 44 causes the white ink to be ejected from the nozzles 36 at the intervals of 1/R in the main scan direction. Based on the white final raster data, the ASIC 43 controls the head drive portion 44, and causes the white ink to be ejected from the ejection head 35 at a timing at which the bit of the raster data is "1." In contrast, based on the white final raster data, the ASIC 43 controls the head drive portion 44 and prohibits the white ink from being ejected from the ejection head 35 at a timing at which the bit of the raster data is "0." Similarly, based on the color final raster data, the ASIC 43 controls the head drive portion 44, and causes the color ink to be ejected from the ejection head 35 at a timing at which the bit of the raster data is "1." In contrast, based on the color final raster data, the ASIC 43 controls the head drive portion 44 and prohibits the color ink from being ejected from the ejection head 35 at a timing at which the bit of the raster data is "0."

The CPU 40 determines whether the movement of the carriage 34 in the main scan direction is complete (step S47). When the CPU 40 determines that the movement of the carriage 34 in the main scan direction is not complete (no at step S47), the CPU 40 returns the processing to step S47. When the CPU 40 determines that the movement of the carriage 34 in the main scan direction is complete (yes at step S47), the CPU 40 starts the movement of the platen 39 (step S49). More specifically, the CPU 40 acquires the pre-scan LF value and the post-scan LF value of the print buffer [Cnt] 422. The CPU 40 adds together the acquired pre-scan LF value and post-scan LF value and identifies the position of the platen 39 after the movement. The CPU 40 starts to move the platen 39 to the position after the movement. Next, the CPU 40 determines whether the movement of the platen 39 is complete (step S50). When the CPU 40 determines that the movement of the platen 39 is not complete (no at step S50), the CPU 40 returns the processing to step S50. When the CPU 40 determines that the movement of the platen 39 is complete (yes at step S50), the CPU 40 advances the processing to step S51.

The CPU 40 determines whether there is the unused print buffer 422 (step S51). When the CPU 40 determines that there is not the unused print buffer 422 (no at step S51), the CPU 40 advances the processing to step S69. On the other hand, when the CPU 40 determines that there is the unused print buffer 422 (yes at step S51), the CPU 40 adds "1" to the counter value Cnt and updates the counter value Cnt (step S53). Based on the updated counter value Cnt obtained by adding "1" to the counter value Cnt, the CPU 40 performs the data acquisition processing shown in FIG. 10 and FIG. 11 (step S55). The data acquisition processing is the same as the data acquisition processing performed at step S17 shown in FIG. 6, and an explanation thereof is thus omitted here. The CPU 40 advances the processing to step S59.

The CPU 40 calculates coordinates of each of positions indicated by the final left margin and the final right margin, as coordinates of the movement origin and the movement destination of the carriage 34 (step S59). More specifically, the CPU 40 acquires the final left margin and the final right margin of each of the print buffer [Cnt−1] 422 and the print buffer [Cnt] 422. The CPU 40 selects the smaller final left margin, of the final left margins of the print buffer [Cnt−1] 422 and the print buffer [Cnt] 422. Similarly, the CPU 40 selects the smaller final right margin, of the final right margins of the print buffer [Cnt−1] 422 and the print buffer [Cnt] 422. In this way, the movement of the carriage 34 can be optimized. The CPU 40 calculates, as the coordinates of the carriage movement origin and the carriage movement destination, the coordinates of each of the positions indicated by the selected final left margin and final right margin. Next, the CPU 40 sets the calculated coordinates, the read pointer table [8] [420] of the print buffer [Cnt] 422, and the main scan direction, as the print direction, in the storage portion of the ASIC 43 (step S61).

The CPU 40 determines whether a predetermined period of time has elapsed from the determination, at step S47, that the movement of the carriage 34 in the main scan direction is complete (step S63). When the CPU 40 determines that the predetermined period of time has not elapsed (no at step S63), the CPU 40 returns the processing to step S63. When the CPU 40 determines that the predetermined period of time has elapsed (yes at step S63), the CPU 40 advances the processing to step S65. By outputting a signal to the ASIC 43, the CPU 40 starts the movement of the carriage 34 in the main scan direction (step S65). The CPU 40 returns the processing to step S47.

At step S69, the CPU 40 starts to move the platen 39 to the position furthermost to the front side (step S69). The CPU 40 moves the carriage 34 to a maintenance position (step S71). The maintenance position is a position in which a wiper (not shown in the drawings) is provided. The CPU 40 performs wiping (step S73). The wiping is processing to scrape off ink that has attached to the nozzles 36, using a wiper. The CPU 40 causes all of the ejection heads 35 to be in a state of being covered by the caps (step S75). The CPU 40 determines whether the movement of the platen 39 is complete (step S77). When the CPU 40 determines that the movement of the platen 39 is not complete (no at step S77), the CPU 40 returns the processing to step S77. When the CPU 40 determines that the movement of the platen 39 is complete (yes at step S77), the CPU 40 ends the main processing.

Main Operations and Effects

As explained above, when it is determined that the print data 421 of the white ink included in the print data 421 is to be printed by the multi-pass method (yes at step S101 of the data acquisition processing, yes at step S152 of the LF value acquisition processing), or when it is determined that the unstable ejection conditions are satisfied (yes at step S102 of the data acquisition processing, yes at step S153 of the LF value acquisition processing), the CPU 40 causes the print data 421 to be printed by the multi-pass method (steps S45 and S65 of the main processing, steps S111, S112, S114 and S115 of the data acquisition processing, and steps S155 and S157 of the LF value acquisition processing). As a result, the duty ratio of the driving waveform to eject the white ink from the nozzles 36 decreases, and thus the interval at which the white ink is ejected from the nozzles 36 becomes longer. Accordingly, the time necessary for the meniscus formation can be secured, and the meniscus is maintained stably. Therefore, the possibility is reduced that the ejection of the ink from the nozzles 36 cannot be performed correctly.

When the color ink is printed by the multi-pass method, there is a possibility that the hue of the printed pixels may change. This is because, for example, in the printing of the multi-pass method, the frequency of the driving waveform for driving the nozzles 36 that eject the color ink decreases and the droplet amount per droplet of the color ink ejected from the nozzles 36 decreases due to the characteristics of the color ink. In the present embodiment, when the white ink is printed by the multi-pass method (yes at step S110 of the data acquisition processing, steps S111 and S112, yes at step S154 of the LF value acquisition processing, step S155), based on the color mask value table 413 shown in FIG. 14, the CPU 40 sets the mask values of the multi-pass method in the color mask table stored in the RAM 42 (step S114 of the data acquisition processing). More specifically, in the color mask value table 413, "0xffff" ("1111111111111111") and "0" are alternately stored as the mask values in the fields of the multi-pass method. Therefore, when the white ink is printed by the multi-pass method, "0xffff" ("1111111111111111") or "0" ("0000000000000000") is set in the color mask tables [1] to [420] for the multi-pass printing, corresponding to the remainder values "1," "2," "3," "4," "5," "6," "7" and "0" obtained by dividing (LFn−1) by "8."

As described above, the CPU 40 sets 100% as the mask percentage of the color ink ejected by the movement in the forward path direction of the carriage 34 in the main scan direction, which is one of the timings at which the white ink is printed by the multi-pas method (step S114 of the data acquisition processing). Further, the CPU 40 sets 0% as the mask percentage of the color ink ejected by the movement in the return path direction of the carriage 34 in the main scan direction, which is the other timing (step S114 of the data acquisition processing). Therefore, the frequency of the driving waveform for driving the nozzles 36 that eject the color ink at the one of the timings does not decrease, and the droplet amount per droplet (hereinafter referred to as a first amount) of the color ink ejected from the nozzles 36 does not decrease. Further, the amount of the color ink ejected at the other timing (hereinafter referred to as a second amount) is "0." In other words, the color ink is not ejected from the nozzles 36. Further, if the mask percentage of the color ink is set to, for example, 75%:25%, instead of 100%:0%, the second amount of the color ink ejected at the other timing is an amount smaller than the first amount. More specifically, since the ejection amount of the color ink of the first amount is larger than that of the second amount, the droplet amount per droplet of the color ink hardly decreases, and it is possible to suppress the reduction amount as a whole, in comparison to when the ejection is performed at 50%:50%. Therefore, the possibility of a change in the hue of the printed pixels is reduced in comparison to when the printing is performed by the multi-pass method in which the amount of the color ink ejected at the one of the timings is the same as the amount of the color ink ejected at the other timing.

Next, an order of printing of the pixel arrays using the color ink of the present embodiment will be explained with reference to FIG. 15. FIG. 15 shows the printing order corresponding to the LF values of the type "white+color" shown in FIG. 13. In the table shown in FIG. 15, row numbers of the pixel arrays are shown in the fields of each of the rows. N in the field of the row is a natural number. In the fields of the printing order, the printing order of a corresponding pixel array is shown by a number. "Forward path" in the fields of the printing direction indicates a case in which the pixel array is printed by the main scan in the forward path direction. On the other hand, "return path" indicates a case in which the pixel array is printed in the return path direction that is an opposite direction to the forward path direction. Further, "forward path (pause)" indicates a case in which the pixel array is not printed in the forward path direction, and "return path (pause)" indicates a case in which the pixel array is not printed in the return path direction. In the color mask value table 413 shown in FIG. 14, "0xffff" ("1111111111111111") and "0" are alternately stored as the mask values in the fields of the multi-pass method. Therefore, the CPU 40 performs the printing of the pixel arrays in the manner shown in FIG. 15.

In the example shown in FIG. 15, firstly, the CPU 40 causes the color ink to be ejected onto the 4N-th row of the pixel array by the main scan in the forward path direction. Next, the (4N−3)-th row of the pixel array is a second printing target. However, as shown in FIG. 14, the color mask value corresponding to the printing order "2" is "0". Therefore, the CPU 40 does not cause the color ink to be ejected onto the (4N−3)-th row of the pixel array by the main scan in the return path direction. Thirdly, the CPU 40 causes the color ink to be ejected onto the (4N−1)-th row of the pixel array by the main scan in the forward path direction. Next, the (4N−2)-th row of the pixel array is a fourth printing target. However, as shown in FIG. 14, since the color mask value corresponding to the printing order "4" is "0," the CPU 40 does not cause the color ink to be ejected onto the (4N−2)-th row of the pixel array by the main scan in the return path direction. Next, fifthly, the CPU 40 causes the color ink to be ejected onto the (4N−2)-th row of the pixel array by the main scan in the forward path direction. Next, the 4N-th row of the pixel array is a sixth printing target. However, as shown in FIG. 14, since the color mask value corresponding to the printing order "6" is "0," the CPU 40 does not cause the color ink to be ejected onto the 4N-th row of the pixel array by the main scan in the return path direction. Next, seventhly, the CPU 40 causes the color ink to be ejected onto the (4N−3)-th row of the pixel array by the main scan in the forward path direction. Next, the (4N−1)-th row of the pixel array is an eighth printing target. However, as shown in FIG. 14, since the color mask value corresponding to the printing order "8" is "0," the CPU 40 does not cause the color ink to be ejected by the main scan in the return path direction. Until the printing of the print data 421 is complete, the CPU 40 repeats the above-described operation. Therefore, the CPU 40 alternately performs control to cause the color ink to be ejected and control to prohibit the color ink from being ejected. As a result, the control to prohibit the color ink from being ejected from the nozzles 36 is not performed continuously, and the possibility of drying of the nozzles 36 that eject the color ink is reduced.

As described above, the CPU 40 performs the ejection control of the color ink from the nozzles 36 at the timing at which the ejection heads 35 for the color ink move in the forward path direction. The CPU 40 does not perform the ejection control of the color ink from the nozzles 36 at the timing at which the ejection heads 35 move in the return path direction. Accordingly, all of the pixel arrays printed by the color ink are those printed by the main scan in the forward path direction. Therefore, landing positions of the droplets of the color ink are aligned and image quality is improved.

As shown in FIG. 15, the CPU 40 does not perform the ejection control of the color ink from the nozzles 36 at the timing at which the ejection heads 35 for the color ink move in the return path direction. Accordingly, the ejection of the color ink is performed only at the timing at which the ejection heads 35 move in the forward path direction. Since 100 percent of the color ink is ejected by the main scan in the forward path direction, the droplet amount per droplet of the color ink hardly decreases. Therefore, in comparison to when the ejection of the color ink is performed at both the timings of the movement in the forward path direction and the return path direction, the possibility of a change in the hue of the printed color ink is reduced.

As shown in FIG. 14 and FIG. 15, the CPU 40 causes the printing with a mask percentage of 100% to be performed at the timing at which the ejection heads 35 for the color ink move in the forward path direction. On the other hand, the mask percentage at the timing at which the ejection heads 35 for the color ink move in the return path direction is 0%. Therefore, the sum of the mask percentages by the main scans in the forward and return path directions is 100%. Therefore, using the simple method of setting the mask percentage, it is possible to control uniform ejection of the color ink with respect to each of the pixels. Further, in the present specific example, the printing of the color ink is performed with a mask percentage of 100% at the timing at which the ejection heads 35 for the color ink move in the forward path direction. Therefore, in comparison to when the color ink is ejected at both the timings at which the ejection heads 35 move in the forward path direction and the return path direction, the possibility of a change in the hue of the color is reduced.

Even when the CPU 40 determines that the command to print the white ink using the multi-pass method is not included in the print data 421 (no at step S152 of the LF value acquisition processing), when the CPU 40 determines that the unstable ejection conditions are satisfied (yes at step S153 of the LF value acquisition processing), the CPU 40 causes the white ink to be printed by the multi-pass method (steps S155 and S157 of the LF value acquisition processing, and steps S45 and S65 of the main processing). Therefore, the duty ratio of the driving waveform to eject the white ink from the nozzles 36 decreases, the ejection interval of the white ink becomes longer, and the time for the meniscus formation can be secured. Therefore, the meniscus is maintained stably, and the possibility is thus reduced that the ejection of the white ink from the nozzles 36 cannot be performed correctly. Further, when the white ink is printed by the multi-pass method, the CPU 40 sets 100% as the mask percentage of the color ink ejected by the movement of the carriage 34 in the forward path direction (step S111 of the data acquisition processing). Further, the CPU 40 sets 0% as the mask percentage of the color ink ejected by the movement of the carriage 34 in the return path direction (step S111 of the data acquisition processing). Therefore, the first amount of the color ink ejected by the main scan in the forward path direction is a maximum amount by which the color ink can be ejected from the nozzles 36, and the second amount of the color ink ejected by the main scan in the return path direction is "0." In other words, the color ink is not ejected from the nozzles 36 by the main scan in the return path direction. Further, if the mask percentage of the color ink is, for example, 75%:25%, instead of 100%:0%, the second amount of the color ink ejected by the main scan in the return path direction is smaller than the first amount. Therefore, as described above, the possibility of a change in the hue of the printed color ink is reduced in comparison to when the printing is performed by the multi-pass method in which the amounts of the color ink ejected at both the timings of the forward path and the return path are the same as each other.

The ejection heads 35C, 35M, 35Y and 35K each eject the color ink. In the printing by the color ink, when the droplet amount of the ejected color ink changes, there is a possibility of a change in the hue of the printing. By performing the above-described control, the CPU 40 can reduce the possibility of a change in the hue of the printing by the color ink.

Modified Example

The CPU 40 may perform the printing of the pixel arrays of the color ink in the manner shown in FIG. 16. Firstly, the CPU 40 causes the color ink to be ejected onto the 4N-th row of the pixel array by the main scan in the forward path direction. Next, secondly, the CPU 40 causes the color ink to be ejected onto the (4N−1)-th row of the pixel array by the main scan in the return path direction. Next, thirdly, the CPU 40 causes the color ink to be ejected onto the (4N−2)-th row of the pixel array by the main scan in the forward path direction. Next, fourthly, the CPU 40 causes the color ink to be ejected onto the (4N−3)-th row of the pixel array by the main scan in the return path direction. Next, fifthly, the CPU 40 does not cause the color ink to be ejected onto the 4N-th row of the pixel array by the main scan in the forward path direction. Next, sixthly, the CPU 40 does not cause the color ink to be ejected onto the (4N−1)-th row of the pixel array by the main scan in the return path direction. Next, seventhly, the CPU 40 does not cause the color ink to be ejected onto the (4N−2)-th row of the pixel array by the main scan in the forward path direction. Next, eighthly, the CPU 40 does not cause the color ink to be ejected onto the (4N−3)-th row of the pixel array by the main scan in the return path direction. Also in the present modified example, as described above, the possibility of a change in the hue of the printed color ink is reduced in comparison to when the printing is performed by the multi-pass method in which the amounts of the color ink ejected at both the timings of the forward path and the return path are the same as each other.

The present disclosure is not limited to the above-described embodiment and each of the modified examples, and various modifications are possible. For example, the ink for the background may be a discharge agent that discharges the color of the print medium. Further, the ink for the background may be a pretreatment agent that causes the color inks to develop vibrant colors. An example of the pretreatment agent is a metal salt, such as CaCl2 or the like. Further, in the above-described embodiment, the movement directions of the carriage 34 are defined such that the forward path direction is from the left to the right and the return path direction is from the right to the left. However, the movement directions of the carriage 34 may be defined such that the forward path direction is from the right to the left and the return path direction is from the left to the right. In the above-described embodiment, examples of determination criteria of the unstable ejection conditions, such as the predetermined temperature 15° C., the predetermined amount 5 ml of the white ink used for the printing of one piece of the print data 421, 50% of the maximum ink amount that can be ejected from one of the nozzles 36 in one cycle of movement of the ejection head 35 in the main scan direction, the predetermined humidity 20%, 24 hours from the end of the printing operation, 3 hours from the end of the maintenance operation, and the predetermined cumulative value 30 ml of the white ink from 9 hours previous to the determination at step S153, are all examples, and the present disclosure is not limited to these values. Optimal conditions may be adopted by experiments or the like.

Further, when the white ink is printed by the multi-pass method, the mask percentage of the color ink ejected from the nozzles 36 of the ejection head 35 of the color ink by the main scan in the forward path direction, and the mask percentage of the color ink ejected from the nozzles 36 of the ejection head 35 of the color ink by the main scan in the return path direction are not limited to 100%:0%. For example, the mask percentages may be 90%:10%, 80%: 20%, 75%:25%, 70%:30%, or the like. In other words, it is sufficient that the second amount of the color ink ejected from the nozzles 36 by one main scan in the return path direction is smaller than the first amount of the color ink ejected from the nozzles 36 by one main scan in the forward path direction.

Further, in FIG. 4, the mask percentage of 50% of the white ink from the nozzle X, and the mask percentage of 50% of the white ink from the nozzle Y are an example, and may be 40%:60%, 60%:40%, 75%:25%, 25%:75%, or the like. It is sufficient that the mask percentages are allocated as appropriate so that the total of the mask percentages of the nozzle X and the nozzle Y is 100% and the white ink is ejected onto all the pixels of a corresponding pixel array. The print device 30 ejects the white ink from the nozzles 36 of the four ejection heads 35W. The print device 30 ejects the cyan ink, the magenta ink, the yellow ink and the black ink from the nozzles 36 of each of the ejection heads 35C, 35M, 35Y and 35K. In contrast to this, the colors of the inks ejected from the nozzles 36 of the four ejection heads 35W and the ejection heads 35C, 35M, 35Y and 35K may be colors different from those of the above-described embodiment.

The number (eight) of the ejection heads 35, the number (420) of the nozzles 36, the distance (1/300 in) between the adjacent nozzles 36 in the sub scan direction, and the distance (150 mm) between the nozzles 36 on the rearmost side of each of the four ejection heads 35W and the nozzles 36 on the rearmost side of each of the ejection heads 35C, 35M, 35Y and 35K in the description above are examples, and may be other values.

The arrangement of the four ejection heads 35W and the ejection heads 35C, 35M, 35Y, and 35K is not limited to the above-described example, and may be another arrangement. The number of the ejection heads 35W is not limited to four, and may be one to three, or may be five or more. The above-described embodiment and each of the modified examples can also be applied when the printing is performed by moving the platen 39 without moving the ejection heads 35. In other words, it is sufficient if the print device 30 moves the platen 39 and causes the platen 39 to move relatively with respect to the ejection heads 35 in the main scan direction and the sub scan direction. Further, the above-described embodiment and modified examples can also be applied when the printing is performed by moving the ejection heads 35 in the main scan direction and the sub scan direction.

In the above-described embodiment, the explanation is made using the adjacent four pixels as an example. However, the number of the adjacent pixels is not limited to this example, and the present embodiment can be applied when the adjacent pixels are the adjacent D×R pixels. In this case, the LF values of the LF value table 411 shown in FIG. 13 may be set, respectively, in association with the remainders obtained by dividing (LFn−1) by (2D×R). Further, the color mask values of the color mask value table 413 shown in FIG. 14 may be set, respectively, in association with the remainders obtained by dividing (LFn−1) by (2D×R).

In the above-described embodiment and each of the modified examples, at step S83 of the data acquisition processing, the CPU 40 identifies the 8×420 pieces of raster data indicated by the 8×420 pointers set in the read pointer table [8] [420] of the print buffer [Cnt] 422. Next, of the raster information stored in the expansion buffer 425, the CPU 40 extracts all of the left margins and the right margins associated with the identified raster data. Then, the CPU 40 sets, as the "final left margin" of the print buffer [Cnt] 422, the smallest of the left margins among all the left margins. In addition, the CPU 40 sets, as the "final right margin" of the print buffer [Cnt] 422, the smallest of the right margins among all the right margins. Then, at step S41 of the main processing, the CPU 40 acquires each of the final left margins and the final right margins of the print buffer [Cnt−1] 422 and the print buffer [Cnt] 422. Next, the CPU 40 selects the smaller final left margin, of the final left margins of the print buffer [Cnt−1] 422 and the print buffer [Cnt] 422. Similarly, the CPU 40 selects the smaller final right margin, of the final right margins of the print buffer [Cnt−1] 422 and the print buffer [Cnt] 422. The CPU 40 selects the final left margin and the final right margin in the manner described above, but the CPU 40 may select (acquire) the final left margin and the final right margin using a method described below.

At step S83 of the data acquisition processing, the CPU 40 respectively identifies the 8×420 pieces of raster data respectively indicated by the 8×420 pointers set in the read pointer tables [8] [420] of the print buffer [Cnt−1] 422 and the print buffer [Cnt] 422. Next, of the raster information stored in the expansion buffer 425, the CPU 40 extracts all of the left margins and the right margins associated with the identified raster data. Then, the CPU 40 sets, as the "final left margin" of the print buffer [Cnt] 422, the smallest of the left margins among all the left margins. Further, the CPU 40 sets, as the "final right margin" of the print buffer [Cnt] 422, the smallest of the right margins among all the right margins. Then, at step S41 of the main processing, the CPU 40 acquires each of the final left margin and the final right margin of the print buffer [Cnt] 422.

Figure 3:
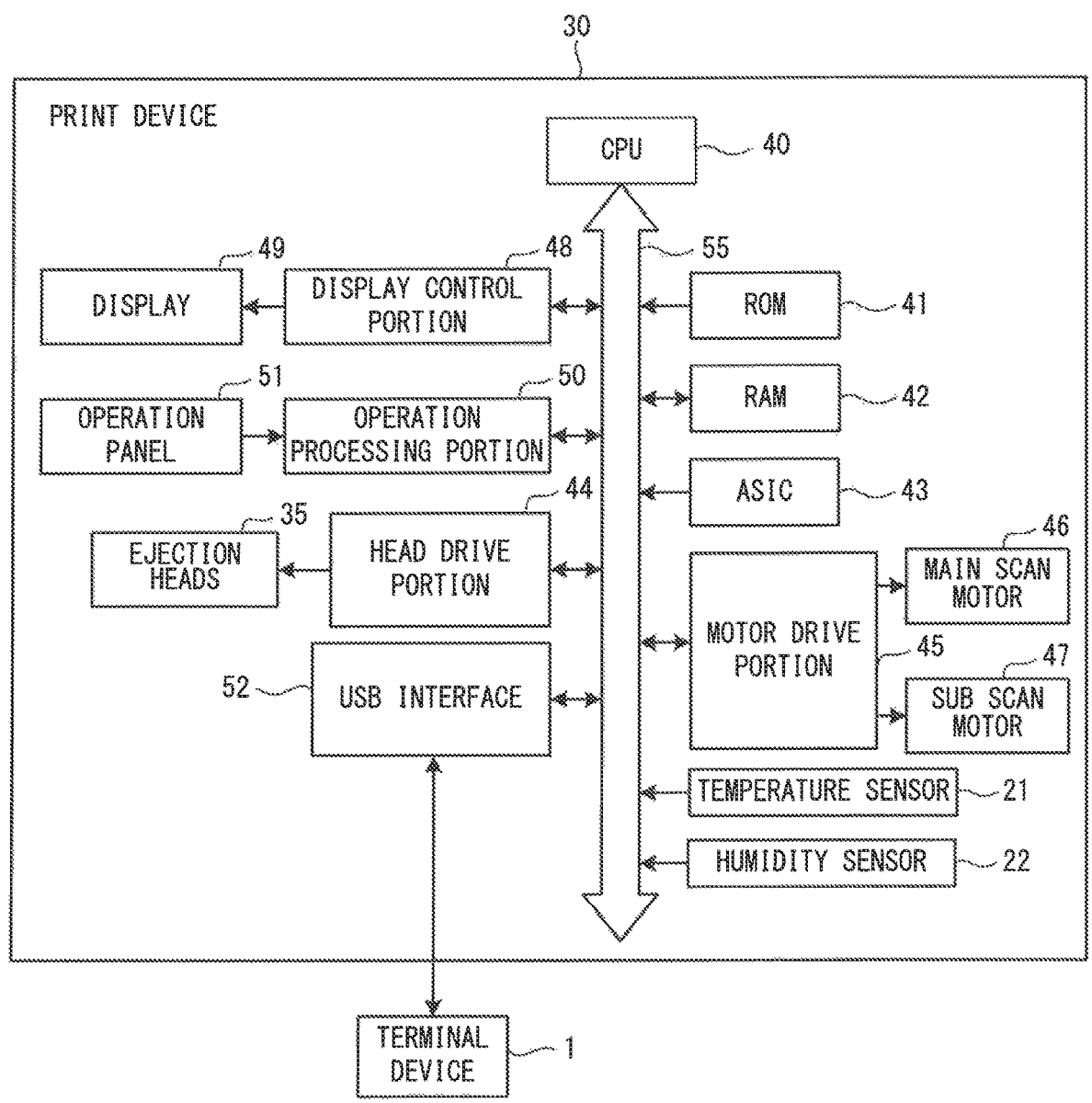
FIG. 3 is a block diagram showing an electrical configuration of the print device.

The CPU 40 shown in FIG. 3 loads various programs stored in a nonvolatile storage device (not shown in the drawings) (a flash memory, for example) to the RAM 42, and performs various processing while using the RAM 42 as a working memory.

Note that the various programs to perform the above-described operations may be stored on a disk device or the like of a server device on the Internet, and the various programs may be downloaded to a computer of the print device 30.

Note also that, depending on an embodiment, other types of storage device apart from the ROM 41 and the RAM 42 may be used. For example, the print device 30 may have a storage device, such as a content addressable memory (CAM), a static random access memory (SRAM), a synchronous dynamic random access memory (SDRAM) or the like.

Note also that, depending on an embodiment, the electrical configuration of the print device 30 may be different to that shown in FIG. 3, and other hardware apart from the standards and types exemplified in FIG. 3 can be applied to the print device 30.

For example, the control portion of the print device 30 shown in FIG. 3 may be realized by a hardware circuit. Specifically, in place of the CPU 40, the control portion may be realized by a reconfigurable circuit, such as a field programmable gate array (FPGA), or an ASIC and the like. Of course, the control portion may be realized by both the CPU 40 and the hardware circuit.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An image formation device comprising:
   a first head provided with a plurality of first nozzles arranged in a sub scanning direction, the first nozzle being capable of ejecting a first ink used for a background;
   a second head provided with a plurality of second nozzles arranged in a sub scanning direction, the second nozzle being capable of ejecting a second ink of a different color from the first ink upon the ejected first ink;
   a carriage conveyed in a main scan direction orthogonal to the sub scanning direction and mounted with the first head and the second head, the second head being arranged in the sub scanning direction with respect to the first head on the carriage;
   a processor; and
   a memory storing computer-readable instructions that, when executed by the processor, cause the processor to:
   perform a first ejection control configured to eject a first amount of the second ink from the second nozzles of the second head at a timing of one of a forward path and a return path in the main scan direction of the carriage, while printing is performed by a multi-pass method in which each of pixel arrays is printed by a plurality of main scans of the carriage and, in each of the plurality of main scans, the first ink is ejected onto the same pixel array from respectively different first nozzles of the first head, and
   perform a second ejection control configured to eject a second amount of the second ink from the second nozzles of the second head at a timing different from the previous timing of the ejection of the second ink, the second amount of the second ink being smaller than the first amount of the second ink, while the printing is performed by the multi-pass method in which the first ink is ejected from the respectively different first nozzles of the first head.

2. The image formation device according to claim 1, wherein the memory further stores computer-readable instructions, when executed by the processor, cause the processor to:
   perform a determination control configured to determine whether to print the first ink using the multi-pass method, on the basis of a print data, and
   cause the first amount of the second ink to be ejected at the timing of one of the forward path and the return path in the main scan direction when it is determined that the first ink is to be printed by the multi-pass method, in the first ejection control.

3. The image formation device according to claim 2, wherein the memory further stores computer-readable instruction, when executed by the processor, cause the processor to:
   determine, in the determination control, whether to print the first ink using the multi-pass method, by determining whether a command to print the first ink using the multi-pass method is included in the print data.

4. The image formation device according to claim 1, wherein the second amount is zero.

5. The image formation device according to claim 1, wherein the memory further stores computer-readable instructions, when executed by the processor, cause the processor to:
   perform the first ejection control and second ejection control on the basis of a mask percentage, which is a ratio at which pixels of the pixel array are printed.

6. The image formation device according to claim 1, wherein the memory further stores computer-readable instructions, when executed by the processor, cause the processor to:
   cause, in the first ejection control and the second ejection control, printing to be performed such that a sum of a first mask percentage and a second mask percentage is one hundred percent and the second mask percentage is smaller than the first mask percentage, the first mask percentage being a percentage at which the pixels of the pixel array are printed by the first amount of the second ink, and the second mask percentage being a percentage at which the pixels of the pixel array are printed by the second amount of the second ink.

7. The image formation device according to claim 6, wherein the memory further stores computer-readable instructions, when executed by the processor, cause the processor to:
   cause, in the first ejection control and the second ejection control, printing to be performed such that the first mask percentage is one hundred percent and the second mask percentage is zero percent.

8. The image formation device according to claim 1, further comprising:
   a head provided with the plurality of nozzles arranged in the sub scan direction, wherein the memory further stores computer-readable instructions, when executed by the processor, cause the processor to:
   form an image, by relatively moving the head in the main scan direction with respect to the print medium and causing the first ink and the second ink to be ejected, and relatively moving the head in the sub scan direction with respect to the print medium, on the basis of a print data.

9. The image formation device according to claim 1, wherein the first ink is white ink; and
   the second ink is a color ink.

* * * * *